United States Patent [19]

Sasagaki et al.

[11] Patent Number: 5,594,524
[45] Date of Patent: Jan. 14, 1997

[54] CAMERA FOR SELECTIVELY INPUTTING OPERATING PARAMETERS AND METHOD

[75] Inventors: Nobuaki Sasagaki; Takashi Saegusa, both of Kanagawa-ken, Japan

[73] Assignee: Nikon Corporation, Tokyo, Japan

[21] Appl. No.: 377,839

[22] Filed: Jan. 25, 1995

[30] Foreign Application Priority Data

Feb. 4, 1994 [JP] Japan .................................. 6-032946
Feb. 4, 1994 [JP] Japan .................................. 6-032948

[51] Int. Cl.⁶ .................................................. G03B 17/18
[52] U.S. Cl. .......................................... 396/287; 396/297
[58] Field of Search ................................. 354/441, 442, 354/443, 471, 472, 474, 475, 289.1, 289.12

[56] References Cited

U.S. PATENT DOCUMENTS

| 5,191,373 | 3/1993 | Nakano | 354/474 |
| 5,210,569 | 5/1993 | Harada | 354/442 |
| 5,249,014 | 9/1993 | Kikukawa et al. | 354/289.12 X |

FOREIGN PATENT DOCUMENTS

| 4-81731 | 3/1992 | Japan . |
| 4-81732 | 3/1992 | Japan . |
| 4-81733 | 3/1992 | Japan . |
| 4-81734 | 3/1992 | Japan . |

*Primary Examiner*—W. B. Perkey
*Attorney, Agent, or Firm*—Oliff & Berridge

[57] ABSTRACT

A camera includes a control unit and display assembly permitting the selective input of operating parameters by a user. A selection component permits the selective input of operating parameters displayed on a display device. Different operating parameters are displayed based upon the selected operating mode. In a first operating mode, the control unit displays a designated number of preset parameters on the display device and only permits the user to select from these designated preset parameters. In a second operating mode, the control unit permits the user to select from a plurality of parameters displayed on said display device. In addition, the control unit permits the user to display additional parameters on the display device. In the method for selectively inputting operating parameters into a camera, an operating mode for the camera is selected. The operating parameters are displayed on a display device based upon the selected operating mode. The operating parameters are then selected and displayed on the display device.

31 Claims, 22 Drawing Sheets

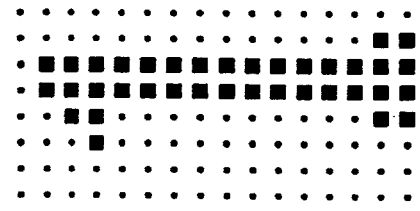
FIG.5a $\Gamma_{01}$
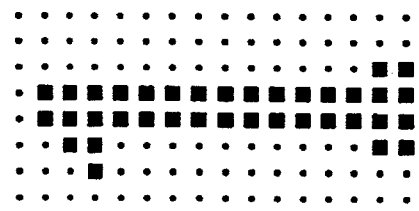
FIG.5b $\Gamma_{41}$
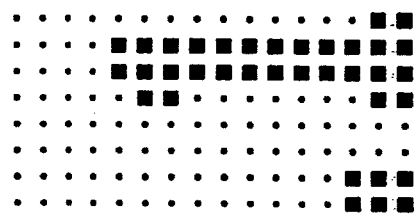
FIG.5c $\Gamma_{11}$
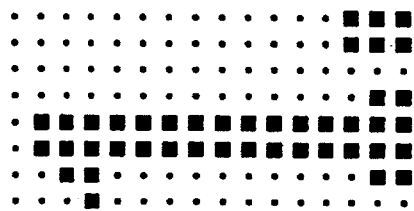
FIG.5d $\Gamma_{1A}$
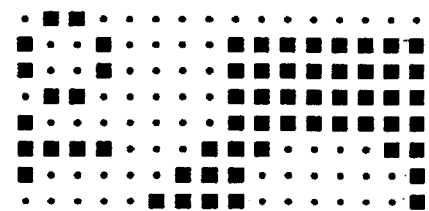
FIG.6a $\Gamma_{80}$, $\Gamma_{81}$
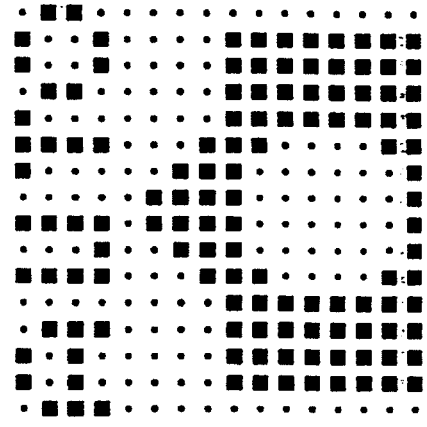
FIG.6b

|   | 00 | 10 | 20 | 30 | 40 | 50 | 60 | 70 | 80 | 90 | A0 | B0 | C0 | D0 | E0 | F0 |
|---|----|----|----|----|----|----|----|----|----|----|----|----|----|----|----|----|
| 0 | 0 | .0 |    | P  | 0  | p  | .  |    | ā  | P  | ⇦  | 👹 | ♋ | ☼ | ⚠ |    |
| 1 | 1 | .1 | A  | Q  | 1  | q  | ,  |    | ā  | P  | ⇦  | 👹 | ♋ | ☼ | ⚠ |    |
| 2 | 2 | .2 | B  | R  | 2  | r  | ·  |    | ▲  | S  | ⇨  | ♅ | ↯ | ☽ | ? |    |
| 3 | 3 | .3 | C  | S  | 3  | s  | ·  |    | ▲  | S  | ⇨  | ♅ | ↯ | ☽ | ? |    |
| 4 | 4 | .4 | D  | T  | 4  | t  | ✦ |    | ♌ | A  | ▥ | — | ♞ | ▭ |    |    |
| 5 | 5 | .5 | E  | U  | 5  | u  | -  |    | ♌ | A  | ▥ | — | ♞ | ▭ |    |    |
| 6 | 6 | .6 | F  | V  | 6  | v  | ‡  |    | ♆ | M  | ▦ | ⊥ | ♘ | ▭ |    |    |
| 7 | 7 | .7 | G  | W  | 7  | w  | ✱ |    | ♆ | M  | ▦ | ⊥ | ♘ | ▭ |    |    |
| 8 | 8 | .8 | H  | X  | 8  | x  | <  |    | ↟ | 🏠 | ♒ | ♠ | ♛ | — |    |    |
| 9 | 9 | .9 | I  | Y  | 9  | y  | >  |    | ↟ | 🏠 | ♒ | ♠ | ♛ | — |    |    |
| A | 0 | 1. | J  | Z  | 0  | z  | =  |    | ⚔ | 🏢 | ◉ | ⊠ | ◉ |    |    |    |
| B |   |    | K  |    | k  |    | :  |    | ⚔ | 🏢 | ◉ | ⊠ | ◉ |    |    |    |
| C |   |    | L  |    | l  |    | /  |    | ER | ISI | S | 🏰 | ⚔ | Eπ |    |    |
| D |   |    | M  |    | m  |    | ?  |    | ER | ISI | S | 🏰 | ⚔ | Eπ |    |    |
| E |   |    | N  |    | n  |    | !  |    | ♖ | ▨ | C  | 🏯 | AF | Y  |    | ▩ |
| F |   |    | O  |    | o  |    | ‖ |    | ♖ | ▨ | C  | 🏯 | AF | Y  |    | ▩ |

FIG.7

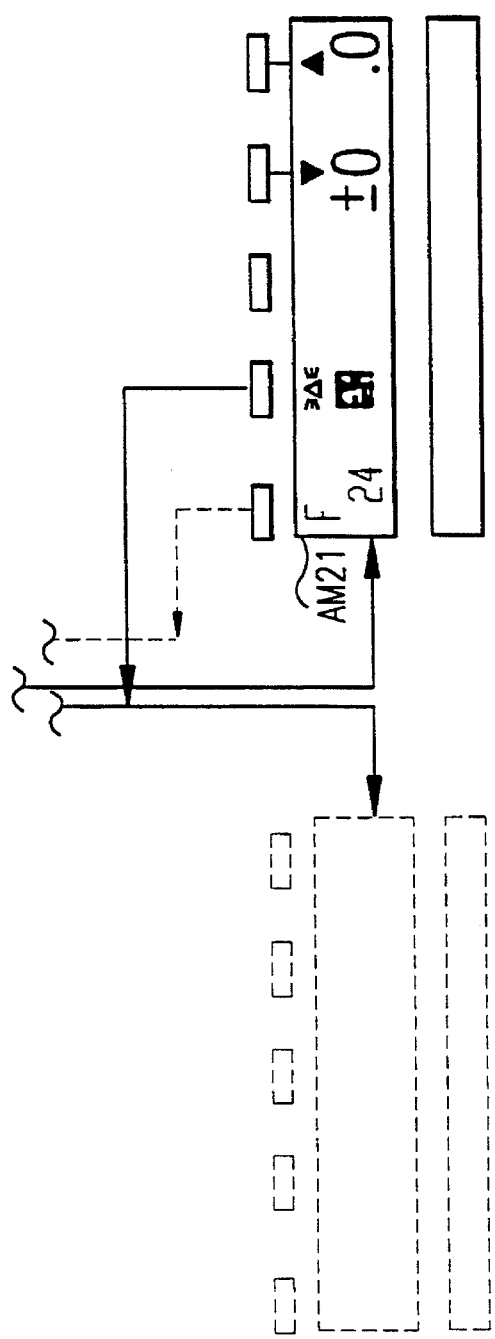

CAMERA FOR SELECTIVELY INPUTTING OPERATING PARAMETERS AND METHOD

This application is directed to subject matter that is related to subject matter in co-pending U.S. patent application Ser. Nos. 08/378,351 entitled "Display System and Method for a Camera," 08/377,604 now U.S. Pat. No. 5,500,711 entitled "Camera Equipped With Warning Function and Method," 08/377,838 entitled "Camera Input and Display Device With Timer and Method," 08/377,840 entitled "Camera With Film Sensitivity Setting Function and Method," 087/377,836 entitled "Camera Display System and Method," 08/378,449 entitled "Camera and Method for Assuring Photography With Selected Parameter," and 08/377,825 entitled "Camera With Simplified Parameter Selection and Dual Mode Operation and Method of Operation", filed simultaneously herewith by the same inventors, which are all hereby incorporated by reference.

BACKGROUND OF THE INVENTION

1. Field of the Invention

The present invention relates to a camera capable of realizing specific functions through the selection of certain parameters.

This invention relates to a camera capable of realizing a specific function by selectively inputting the parameter such as the exposure mode, etc.. Especially, this camera relates to a camera capable of selecting the targeted parameter from a plurality of selection branches prepared selectively in advance.

2. Description of Related Art

In recent years, with the installation of computers, cameras are capable of performing numerous functions (such as, for example, automatic focusing adjustment (AF) and automatic exposure (AE)). Additionally, various substantive monitoring functions (such as, for example, monitoring the film sensitivity setting, detecting the number of frames of film, and warnings of camera deflection) have been developed. In order to confirm the operation of the multi-function and various types of monitors mentioned above, and the data in connection to these functions, for example, the setting of various types of parameters in automatic exposure, data for setting various types of parameter for adjusting the automatic focus, and the display of the monitored data have become necessary. Therefore, in recent years, cameras have been equipped with display devices such as liquid crystal displays.

Japanese Unexamined Utility Model Publication No. Hei 3-42141 discloses a display device for a camera. The developing device displays photographic information relating to the camera on a display of dot LCDs (liquid crystal display devices) located on the camera main body. The display panel of the display device is divided into a plurality of areas. The camera is equipped with a divided display device that displays each sub-titled information in each area. The total display device, which displays the detailed data in display section described above, the sub-title information selection device, which selects one of the sub-titles displayed by the divided display device, and the display screen switch over device, which displays the subordinated data of the sub-titled information being selected, to the display section via the total display device described above, when one of the sub-titles is selected. While the photographer watches the sub-title information being displayed, he or she executes the switching operation until the desired sub-title data is displayed.

When the desired sub-title is displayed on one of the divided areas, the operation switches the corresponding areas in order to select a sub-title. In this manner, when a sub-title is selected, the subordinated data of the sub-title information is displayed on the display section, via a total display device by the display screen switch over device.

The problem exists that the corresponding relationship between the operational switches and the display is not clear in the conventional technology. Furthermore, while the photographer watches the displayed sub-title information, it is necessary to operate the switch until the desired sub-title information is displayed. This is time consuming. In addition, with the conventional technology, when the desired sub-title is displayed in one of the divided areas, the operation switch corresponding to each area needs to be operated in order to select the title. Therefore, it is necessary to accomplish both an operation for display and a separate operation for selection, making the operation complicated. The need to repeat this operation further inconveniences the user. Especially, when complicated operations are needed, it is difficult for a user unaccustomed with the system to accomplish the targeted function.

Especially with cameras, the exposure mode is a necessary parameter for successful operation. However, in the conventional camera, there is no concept that the exposure mode should be set separately from the parameters for photographer, and this is causing unnecessary confusion to the photographer.

In addition, if the operation is too complicated, the problem may occur that the user may lose the present settings of the camera. In other words, when an operation is repeated many times, the photographer loses the settings being established at the time. Even if he or she tries to confirm them via the display, it is not clear what to look for. Furthermore, the operation itself is so complicated that it becomes difficult to easily return to the initial display.

SUMMARY OF THE INVENTION

The present invention attempts to solve the above described problems, and it is an object of embodiments of the present invention to provide a camera for which the input of operation parameters can be accomplished easily, even for users who are not accustomed to the camera.

It is also an object of embodiments of the present invention to provide a camera with a display that is easily understood and permits the easy input of characters where necessary.

It is an additional object of embodiments of the present invention to provide a camera in which the exposure mode can be separately input.

It is a further object of the present invention to provide a camera that is capable of inputting the selected parameters from a plurality of parameters for which the data can be selected in advance. The camera is equipped with an operational component for switching input modes. A control device controls the operation of the camera and accomplishes at least a process for receiving the switch over operation of the operational component described above and a process for receiving selected input of the parameters at each input mode.

The control device has at least two operating modes. In a first mode, the control unit converts a plurality of parameters into selected branches. The photographer can only select parameters from the selected branches. In a second mode, the control unit converts all of the stored parameters into the selected branch. The process thus accomplishes flexibility in terms of the selection of parameters.

The present invention is preferably equipped with a display device having a dot matrix display component comprised of a plurality of display blocks. A selection operation component selects the parameters described above from the display blocks.

The control device accomplishes a first display that displays the selected branch on the display block units to accomplish the selection of parameters. The control device also executes a process to accomplish at least a second display for when a data element is selected and a process for receiving the selection input operation by the selection operational component described above.

The number of parameters being selected in the first mode described above can be less than the described number of display blocks. In addition, the number of parameters being selected in the second mode described above can be greater than the number of display blocks described above.

The operational component is capable of accomplishing the switch over of the input mode of parameters by this means.

By accomplishing the above, only a limited number of parameters comprise the selection branch in the first mode. Therefore, the user is able to select a parameter branch without confusion. In this case, for example, an exposure mode could be the selected branch. On the other hand, in the second mode, selection is accomplished for all possible stored branches. Therefore, it is possible for the user to determine the desirable photographic conditions and to establish the appropriate details. By so doing, a camera with high functionality can be used widely in accordance with the technological know-how of each user, from the beginner to an accomplished photographer.

BRIEF DESCRIPTION OF THE DRAWINGS

The invention will be described in conjunction with the following drawings in which like reference numerals designate like elements and wherein:

FIG. 4b is a plan view of a display block of the display panel structure of FIG. 4a;

FIG. 5(a)–5(d) is an explanatory diagram showing one of the examples of the display mode in the embodiment according to the present invention;

FIGS. 6a and 6b depict an example of the display mode of an embodiment according to the present invention;

FIG. 7 is an explanatory diagram showing one of the examples of the display patterns with which the pattern generator is equipped as used in the embodiment according to the present invention;

FIGS. 17(a)–17(d) is an explanatory diagram showing the corresponding relationship between the display and the switch operation in the advanced mode according to an embodiment of the present invention.

DETAILED DESCRIPTION OF PREFERRED EMBODIMENTS

An explanation of an embodiment of the present invention is provided hereafter, with reference to the drawings.

Figure 1:
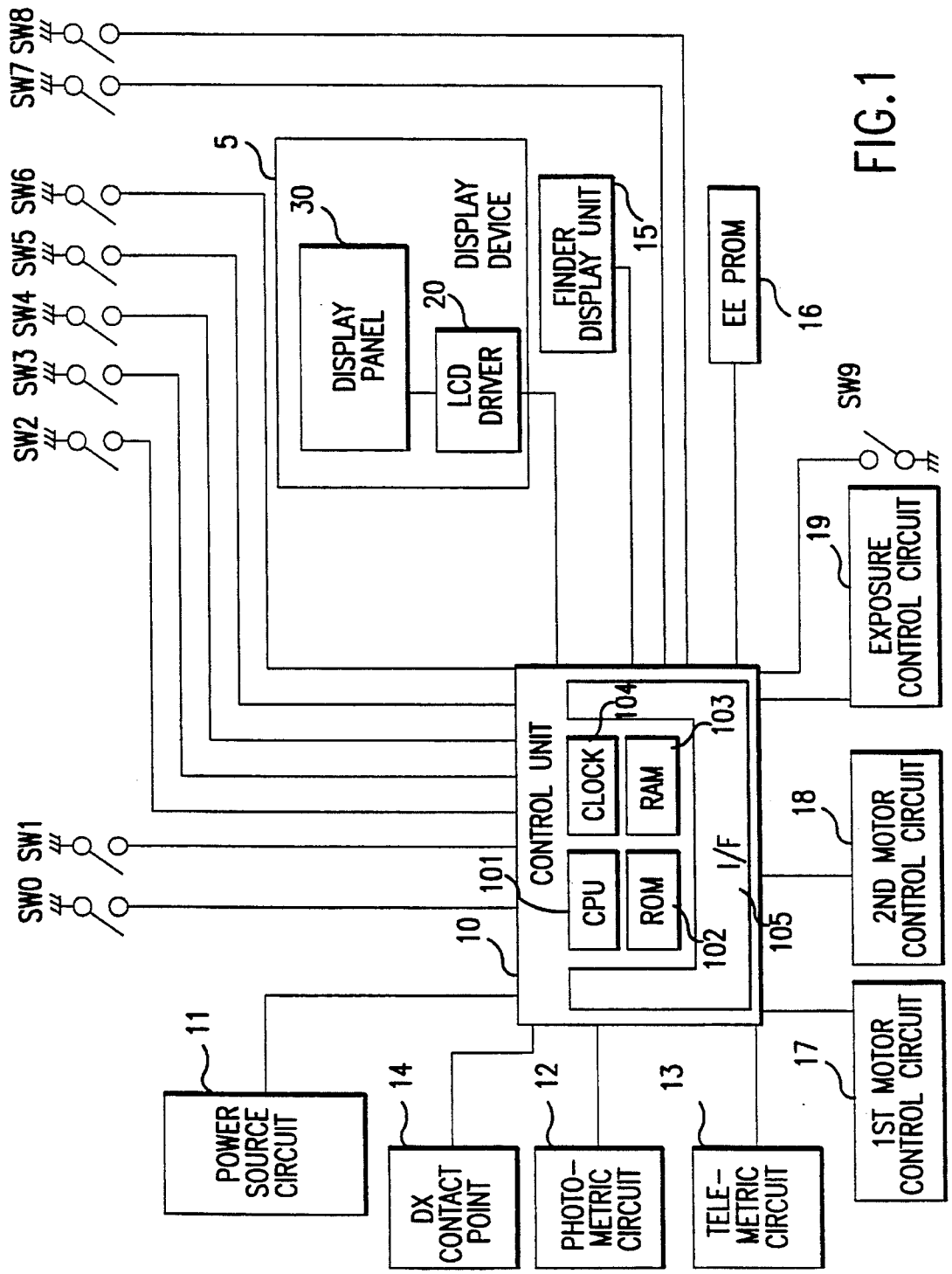
FIG. 1 is a block diagram of an embodiment of camera having a selective input and display device according to the present invention.
Figure 2:
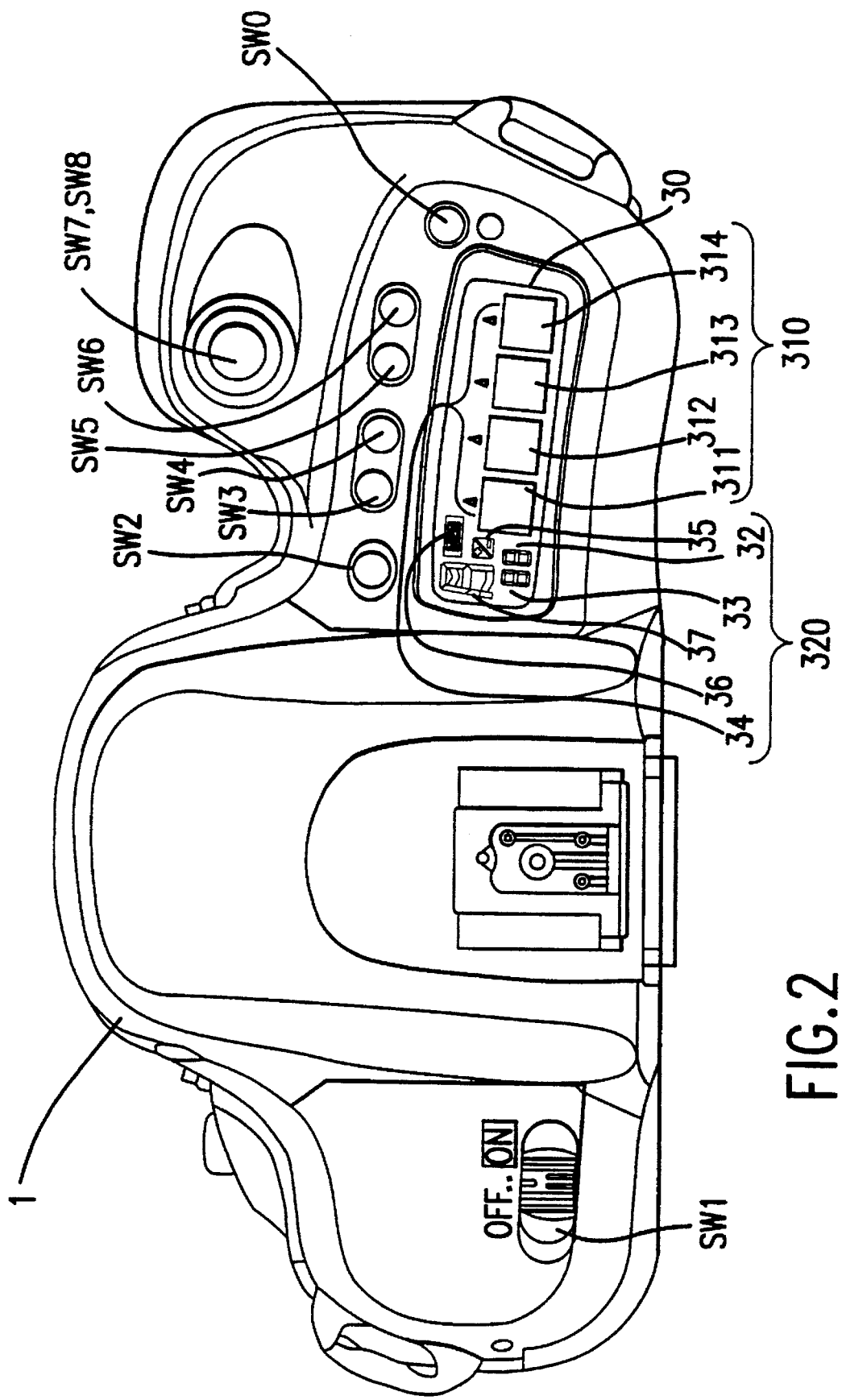
FIG. 2 is a top view of embodiments of camera having a selective input and display the device according to the present invention.

FIG. 1 is an example of the hardware structure of an embodiment of a camera according to the present invention. FIG. 2 depicts the external appearance of an upper surface body of a camera according to the present invention. The embodiment shown in FIG. 1 includes a display device 5 that displays operating data for the user. A control unit 10 controls the camera operation. The control unit 10 includes photometric circuit 12 for performing photometry, a distance survey circuit 13 for measuring distance, a DX contact 14 for reading film sensitivity, a first motor control circuit 17, a second motor control circuit 18, and an exposure control circuit 19. The control unit 10 also includes an EEPROM (read only memory capable of re-write) 16 that functions a memory device storing data, such as preset operating parameters, connected with a finder display device 15. The control unit 10 controls and monitors the above described operations simultaneously. The control unit 10 may also include a sensor (not shown) for monitoring the camera movement. An electric source circuit 11 is provided to supply electric power.

The first motor control circuit 17 controls the motor (not shown) driving the lens, otherwise termed a zoom drive and focus drive. The second motor drive circuit 18 controls the motor (not shown) operating the mirror up and down drive and film supply drive. The exposure control circuit 19 controls the operation of the aperture, shutter and adjustment of light.

The display device 5 has a display panel 30 installed on an upper surface of the body 1, shown in FIG. 2. The display panel 30 may contain a liquid crystal display panel, although other types of display elements can be used. An LCD driver 20 located within the body 1 includes a driving device for the display panel 30. The display panel 30 includes a dot matrix display component 310 and a segment display component 320. The picture elements of the dot matrix display 310 and the segments of the segment display component 320 are determined by the shape and location of electrodes on the display panel 30.

Figure 4A:
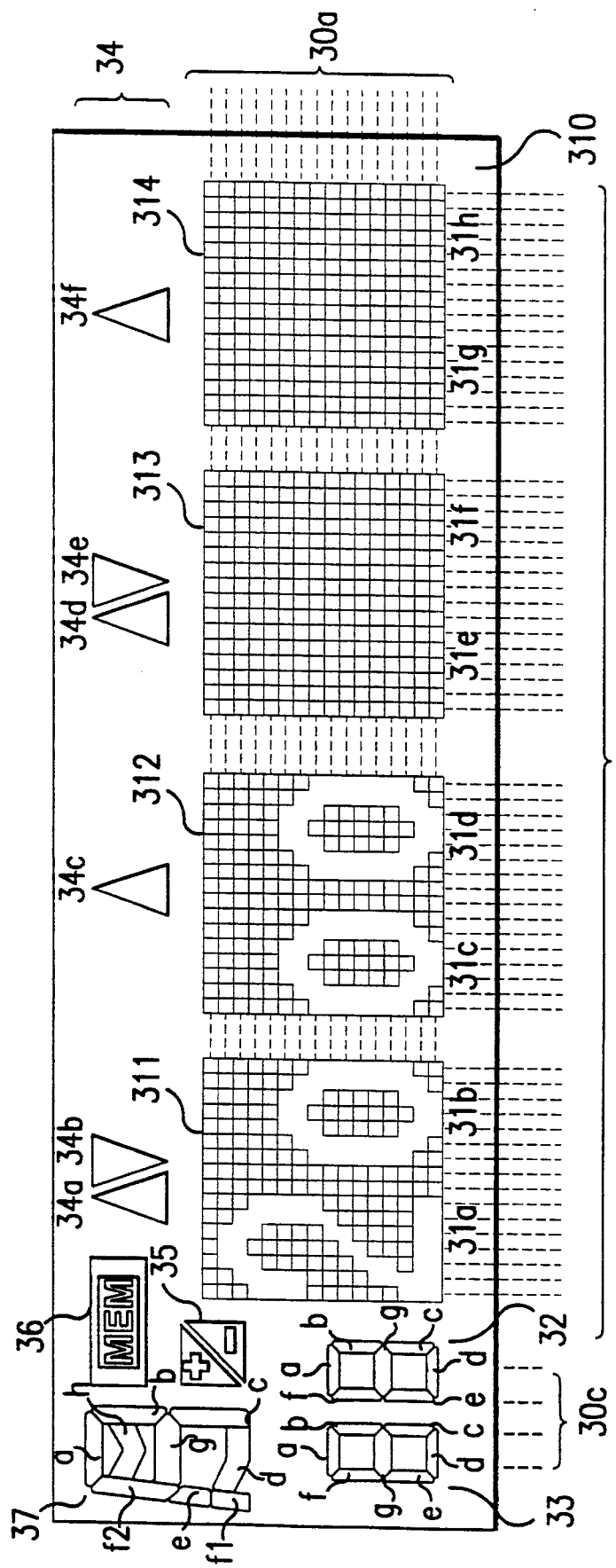
FIG. 4a is a top view of the examples of the display panel structure according to an embodiment in the present invention.

The dot matrix display component 310, shown in FIG. 4a, includes a plurality of display blocks 311, 312, 313 and 314. The display blocks 311–314 include dot matrix display units 31a–31h. Each display unit preferably has a column width equal to an en or half em pica, with an "em" being the space occupied by an "M" in pica-size type and an "en" being the space occupied by an "N" in pica-size type. Each of the display units 31a–31h has 16 vertical dots and 8 horizontal dots. The dot matrix display units 31a–31h are arranged in pairs to form the display blocks 311–314. Each display unit, 31a–31b for example, is arranged together to form display block 311.

The display blocks 311–314 are horizontally spaced on the display panel 30. The spaces between the display blocks permit easy identification of the patterns, e.g., letters, number or icons, displayed within each block. In this embodiment, electrodes are not installed in the spaces between the display blocks 311–314 of the dot matrix display component 310. Alternatively, the spaces may be created using electrodes between the display blocks. With such an arrangement, a space in the space area is created by displaying an empty space (an unlit dot) on the electrode.

Figure 4B:
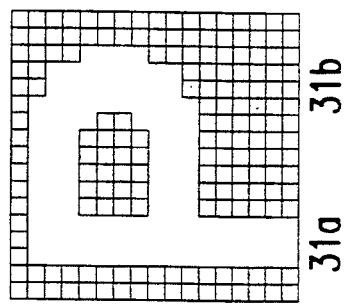

Each pair of dot matrix display units, shown in FIG. 4b, for example, has a column width equal to an em using a 16×16 dot matrix. There are 16×8 dot matrices in the dot matrix display component 310 connected to sixteen pieces of common terminal 30a and sixty-four pieces of the segment terminal 30b. Each display block is operated by voltage being applied to the terminals. The sixteen pieces of common terminal 30a produce a 1/16 duty cycle. The present invention, however, is not limited to the above described matrix. Other m×n matrices are possible, for example, a 24×16 matrix can be used.

The segment display component 320 is equipped with segment display components 32 and 33. Each segment display component contains seven segments. Each of the seven segment display components 32 and 33 contains segments a through g. It is possible, however, to form each of the segments from more than one segment. The segment display component 320 also includes an auxiliary display component 34, an exposure adjustment display component 35 indicating when exposure adjustment is performed, a memory mode display component 36 indicating when the control unit is set to move to the picture taking mode stored in the memory, and mode display component 37 displaying the present operating mode of the camera.

The auxiliary display component 34 includes triangle shaped segments (triangle segment) 34a–34f. The bases of triangle segments 34a, 34c, 34d and 34f are positioned adjacent the display blocks 311–314 The triangle segments 34b and 34e are oppositely oriented to the triangle segments 34a, 34c, 34d and 34f and are adjacent the display blocks 311 and 313 and the triangle segments 34a and 34d.

The exposure adjustment display component 35 and the memory mode display component 36 each include one segment. The mode display component 37 includes display portions 37a, 37b, 37c, 37d, 37e, 37f1, 37f2, 37g and 37h that form the letters "P," "S," "A," "M," and "F." The letters "P," "S," "A," "M," and "F" refer to the initial letters of the operating modes of the camera and the F-stop. Display portions $37f1$ and $37_{f2}$ are wired as a common segment $37f$ whereby the mode display component 37 includes a total of eight segments.

The thirty segments in the segment display component 320 are connected to the common terminal 30a in common with the dot matrix display component 310. This also produces a 1/16 duty cycle. With this arrangement, it is necessary to use at least two pieces of segment terminals. Although additional terminals may be used. In a present embodiment, for example, shown in Table 1, the thirty segments are connected to four pieces of segment terminal 30c (SEG 64 through SEG 67) and eight pieces of common terminal 30a (COM 0–7).

TABLE 1

|  | COM 7 | COM 6 | COM 5 | COM 4 | COM 3 | COM 2 | COM 1 | COM 0 |
| --- | --- | --- | --- | --- | --- | --- | --- | --- |
| SEG 64 |  | 32g | 32f | 32e | 32d | 32c | 32b | 32a |
| SEG 65 |  | 33g | 33f | 33e | 33d | 33c | 33b | 33a |
| SEG 66 | 36 | 35 | 34f | 34e | 34d | 34c | 34b | 34a |
| SEG 67 | 37h | 37g | 37f | 37e | 37d | 37c | 37b | 37a |

As described above, in this embodiment, the segment display differs from the dot matrix display in shape. With this arrangement, the size of the segments differ from the dot matrix display but are similarly driven. This simplifies the circuitry when a common drive is used. When the segment display component is separated from the dot matrix and is independently driven, the characteristics of the segment display are controlled separately from the dot matrix display. This can improve the characteristics of the display. This, however, is not advantageous unless the characteristics of both display components are improved.

Figure 3:
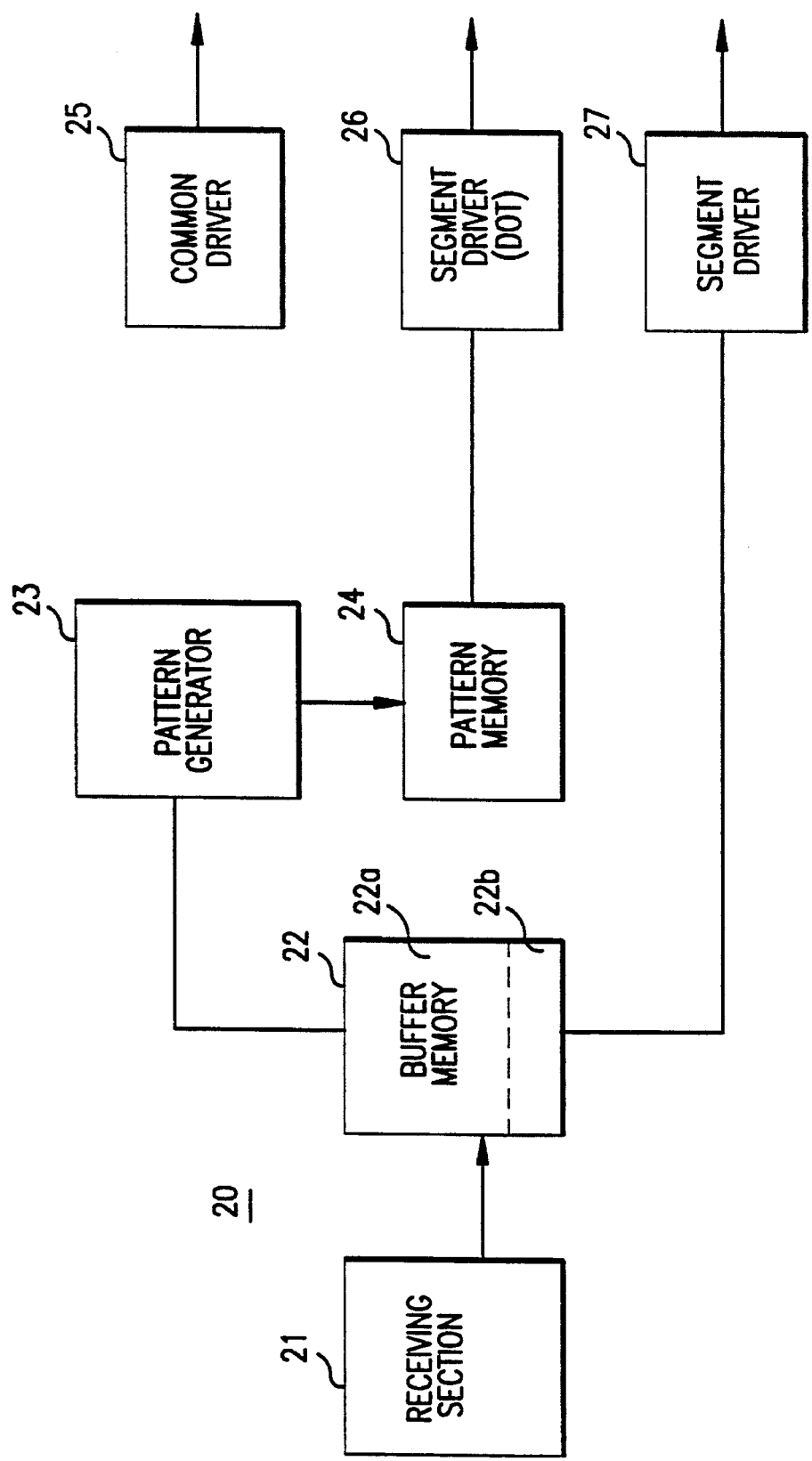
FIG. 3 is a block diagram depicting an embodiment of a liquid crystal driver structure used in the selective input and display device according to the present invention.

FIG. 3 depicts the structure of an LCD driver 20 according to an embodiment of the present invention. The LCD driver 20 is equipped with a receiver 21 for receiving signals from the control unit 10. A buffer memory 22 temporarily stores data from the receiver. A pattern generator 23 reads the data commands stored in the buffer memory 22 and creates a pattern indicated by the signal from the control unit 10. A pattern memory 24 stores the created symbol pattern. A common driver 25 drives the dot matrix display component 310 and the segment display 320 of the display panel 30. A segment driver 26 reads the symbol patterns stored in the pattern memory 24 and displays them as dots. A segment driver 27 reads the segment display data contained in the data stored into the buffer memory 22 and drives the corresponding segments. The buffer memory 22 has the capacity to store twelve bytes of data, and is divided into dot data memory block 22a for the dot matrix display component 310 and a segment data memory block 22b for the segment display 320. The command driver 25 operates the common signal wire of the dot matrix display 310 and the segment display 320 via the common terminal 30a. The segment driver 26 operates the dot matrix display 310 via the segment terminal 30b. The segment driver 27 operates the segment display 320 via the segment terminal 30c.

The pattern generator 23 includes memory (not shown) and a reading drive circuit (not shown). The memory stores the character patterns, including letters, numbers, symbols and icons, shown in FIG. 7. These patterns depict the symbols displaying the contents of a selected branch and the symbols displaying a warning, etc. In FIG. 7, the horizontal rows correspond to the superordination addresses and the vertical columns correspond to the subordination addresses. With this arrangement, 256 patterns are possible.

The numeral patterns in FIG. 7 between the address "00"–"0A" and "40"–"4A" are similar to the display patterns shown in FIG. 5. The display position of each numeral, however, is dislocated slightly. In this manner, numerals of plural digits are displayed over the plurality of display blocks 311–314. The dislocations are eliminated by the spaces between each display block. This produces a balanced display. For example, in the display shown "2000" in FIG. 4a, "0A" and "4A" are used to display the same "0". The "4A" is identical in shape with "0A", however, it is displaced to the left by one dot. As a result, it is possible to occupy a larger space in the display block and create a balance of space between the display blocks such that the display is uniformly spaced, In the present embodiment, shown in FIG. 5, the numerical patterns including decimal points are prepared in advance for the display of the numerals including a decimal point. By so doing, it is possible to eliminate the display digit for the decimal point and to save the numbers in the display digits. In addition, in the case of displays including a decimal point, it is also possible to show a uniformly spaced display. In addition, in the present embodiment, a pattern is prepared in which the height of the first position numeral of a number less than one is made small, as the numeral of address "11". In order to correspond to the custom of displaying small numerals smaller after the decimal point, as in the display of the F value in the camera.

In FIG. 7, the address "00"–"7F" includes data for the en or half em display, and the address "80"–"FF" includes the data for an em display. In the em display pattern after the address "80", the same pattern will continues in matching pairs as shown, in order to make the explanation of this specifications easily be understood. In actuality, as shown in FIG. 6a, for each of the patterns, the left half for the even number of the continuous pattern and the right half for the odd number pattern is stored in memory. Therefore, combining the two, as shown in FIG. 6b, a single icon is structured. In addition, in FIG. 5 and FIGS. 6a and b, the section indicated by "." represents a blank space. In the figures "." is displayed to make the dot placement more easily understood.

In FIG. 7, the dot patterns indicating numerals, letters, and icons not discussed in the present embodiment are included. These can be displayed by designating the appropriate address. In this manner, the purpose for storing the patterns not used in this embodiment is so that the pattern generator can be used in common with other cameras or displays. By so doing, a reduction in cost can be promoted.

The control unit 10 is equipped with a central processing unit (CPU) 101 performing various processes (such as, for example, overseeing and controlling the operation of the camera.) A ROM (read on memory) 102 stores a program and various types of constants in memory. A RAM (random access memory) 103 is used as memory for data of the operating modes of the camera. The control unit 10 further includes a clock circuit 104. An interface circuit (I/F) 105 performs the input and output processes with the circuits, etc., outside the control unit 10. The program stored in the ROM 102 performs the instructions, discussed below, for controlling the operation of the camera. In addition, the timer function is mounted in the central process unit 101. In the present embodiment, this timer is used for timer movement, explained hereafter.

The switches SW0–SW9 are connected to the control unit 10 through an input port of the interface circuit 105. The switches SW0–SW8 are located on the upper surface of the body 1, shown in FIG. 2. The switch SW0 is an OFF-ON mode switch that functions as the mode switch operational component. The simple mode is designated when the switch is "OFF." The advanced mode is designated when the switch is "ON." The simple mode permits the user to select from a limited number of selection branches. The simple mode is suitable for the users who are not accustomed with the operation of the camera. The advanced mode selects freely from a plurality of selection branches according to the desire of the user. The advanced mode is most suitable mode for users demanding high functionality.

Switch SW1 is the power source switch. Switch SW2 corresponds to the left most position of the LCD display section and functions as an operational change component or menu button to call out the menu. Switches SW3–SW6 correspond to the display blocks 311–314. The switches SW3–SW6 form a switch group. Switch SW7 is a half-depression switch operated by the first stroke of the release button. Switch SW8 is a shutter release switch operated by the second stroke of the release button. Switch SW9 is located on the back cover of the body.

The display blocks 311–314 of the dot matrix display section 310 are horizontally displaced across the display panel 30. The switches SW3–SW6 of first switch group are placed in parallel with the display blocks 311–314. The switches SW3–SW6 are positioned to correspond, respectively, to the display blocks 311–314. The icons for the selected branches displayed on the display blocks 311–314 correspond to the switches SW3–SW6 with the operation of the control unit 10. The switch group is located on the right front side of the upper surface of the body 1. This permits easy operation and access of the switch group by hand. Switch SW2 is spaced from switch SW3 of the switch group. This spacing reduces inadvertent operation of switch SW2 when the switch SW3 of the switch group is operated.

The triangle segments 34a–34f of the auxiliary display section 34, described previously, function as display elements to optically indicate the relationship between the icons of the selection branches displayed on the display blocks 311–314 and the switches SW3–SW6. In a present embodiment, the auxiliary display section 34, as shown in FIG. 2, is located between the display blocks 311–314 and the first switch group.

The state register M0 and mode register M1 are installed in the RAM 103 of the control unit 10. The memory contents of these registers are shown in Table 2 and Table 3.

TABLE 2

| M0 | State register | |
|---|---|---|
| 0 | Non-selection state (Execution screen) | Simple Mode |
| 1 | Mode selection state (Selected screen) | |
| 2 | Function selection state (Selected screen) | Advanced Mode |

The state register M0 indicates the operating state of the camera. When M0 is set to 0, the camera is operating in the non-selection state. When M0 is set at 1, the camera is in the mode selection state. When M0 is set at 2, the camera is in the function selection state. In the simple mode, only numerical values 0 and 1 are used. In the advanced mode, all numerical values 0, 1, and 2 can be used.

A total of eleven operating modes from 0 to 10, shown in Table 3, can be selectively set with binary numerals in the mode register M1. In the simple mode, one of four operating modes can be selected. These operating modes include the automatic mode P0, the scenery mode P1, the portrait mode P2 and the close up mode P3. These four modes are program exposure modes. The automatic mode is a program exposure mode that permits the combination of the most general shutter speed and aperture value. Each of the scenery, portrait, and close up modes is a program exposure mode that combines the shutter speed and the aperture value to create the most effective picture for each photographed object under these circumstances.

In the advanced mode, several additional operating modes can be selected inclusive of those previously described. The additional modes include the sports mode P4, the night view mode P5, the silhouette mode P6, the inspiration mode P7, the shutter priority mode S, aperture priority mode A and the manual mode M. Selection of one of these modes can be accomplished at the first display. These selections are equivalent to data being input into the camera and are equivalent to the parameter input that designates the operating conditions of the camera.

TABLE 3

| M1 | Mode register | |
|---|---|---|
| 0 | P0: Automatic mode | Simple Mode |
| 1 | P1: Scenery mode | |
| 2 | P2: Portrait mode | |
| 3 | P3: Close up mode | |
| 4 | P4: Sports mode | Advanced Mode |
| 5 | P5: Night view mode | |
| 6 | P6: Silhouette mode | |
| 7 | P7: Inspiration mode | |
| 8 | Shutter priority (S) mode | |
| 9 | Aperture priority (A) mode | |
| 10 | Manual (M) mode | |

The control unit 10 structures the command column on RAM 103 and performs the serial transfer of data to the LCD driver 20, an example is shown in Table 4. The command column is structured with 12 bytes, D0 to D11. Each byte, D0 to D11, is transferred in serial order. Each of the commands corresponds to the display units 31a–31h of the dot matrix display section 310 and the segments 32–37. The display data for display of each display section are stored in each byte.

TABLE 4

| Control Unit Data | Command | Contents |
|---|---|---|
| D0 | 1 byte | Display data for dot matrix 31a |
| D1 | 2 | Display data for dot matrix 31b |
| D2 | 3 | Display data for dot matrix 31c |
| D3 | 4 | Display data for dot matrix 31d |
| D4 | 5 | Display data for dot matrix 31e |
| D5 | 6 | Display data for dot matrix 31f |
| D6 | 7 | Display data for dot matrix 31g |
| D7 | 8 | Display data for dot matrix 31h |
| D8 | 9 | Display data for segment 32 |
| D9 | 10 | Display data for segment 33 |
| D10 | 11 | Display data for segments 34–36 |
| D11 | 12 | Display data for segment 37 |

Data for the dot matrix display unit 31a, for example, is described in D0. This creates the memory address of the pattern corresponding to the pattern generator 23. The data for segment display is described in D8–D11. D8 accomplishes the lighting of segments a–g of the segment display section 32 using the bits 0 through 6. D9 accomplishes the lighting of the segments a–g of the segment display section 33 using the bits 0 through 6. D10 accomplishes the lighting of the segments a through f of the auxiliary display section 34 using the bytes 0 through 5, and the lighting of the memory mode display section 36 and the exposure auxiliary display section 35 are accomplished using the bits 7 and 6. In addition, D11 accomplishes the lighting of the segments a through h of the mode display section 37 using bits 0 through 7.

In the command example shown in Table 4 described above, the block display sections 311–314 are driven with the en or half em display unit. However, the present invention is not limited to the above. It is appropriate to indicate an icon with an em. In addition, in the case that 0 and 1 are transferred alternately with a certain cycle, each byte of D8 through D11, is capable of accomplishing a flash display corresponding to its cycle.

The mode register M1 is stored in RAM 103 and EEPROM 16 in a similar format with Table 3. When the switch SW2 is continuously pushed for a certain time, such as, for example, more than one second in the present embodiment, the mode is converted to the automatic mode. This is referred to as an automatic or default jump. If the desired operating mode among the operating modes shown in Table 3 is stored in the memory, the operating mode can be switched over to the operating mode stored in the memory at the time of the default jump. The mode register M1 for memory comprises the register for storing the memory of that mode. RAM 103 of the control unit 10, however, loses its contents when the power source is cut off. When the power source is cut off, the contents of the mode register M1 for this memory is saved into EEPROM 16. When a mode is not saved in the memory, the automatic mode having the highest generality is set corresponding to 0 of the initial value.

The operation of an embodiment of the present invention will be described with reference to FIGS. 1–7, described previously, the flow charts in FIGS. 8–15, and the display examples shown in FIGS. 16–18. With the present embodiment, various parameters designate the operation of the camera, the exposure mode, aperture value, shutter speed, etc. shown in Table 3 above, as the parameters.

With the present embodiment, the control unit 10 performs the menu display (the first display) process in order to select the data element, the process of selection in the further subordination hierarchy after initial selected, the verification process of the selected branch being selected, the change of the input mode, and the skip process to a specific predetermined mode. In addition, the process of setting the film sensitivity is also performed.

In the present embodiment, it is possible to select a simple mode and an advanced mode by operating the mode switch SW0. The corresponding relationship of the display and the switch may differ depending upon the mode. However, the selected input of numerous information is basically possible by using the same display panel in the same display mode, with the same switch group in the same manner. Furthermore, since the symbol indicating the selection branch is shown in one column at one time, it is easily seen and is easily selected.

In the present embodiment, the role accomplished by the first switch group in each mode, for example, is shown in Tables 5 and 6. Table 5 shows the role accomplished by switches SW3–SW6, in accordance with the mode at that time, in the implementation screen of the advanced mode.

TABLE 5

| M1 | Advanced mode | SW 3 | SW 4 | SW 5 | SW 6 |
|---|---|---|---|---|---|
| 0 | Program mode | | | −½ program shift | +½ program shift |
| 1 | | | | | |
| 7 | | | | | |
| 8 | Shutter priority mode | TV − ½ | TV + ½ | | |
| 9 | Aperture priority mode | | | AV − ½ | AV + ½ |
| 10 | Manual mode | TV − ½ | TV + ½ | AV − ½ | AV + ½ |

Table 6 shows the roles of switches SW3–SW6 in the selection screen of the simple mode.

TABLE 6

| | SW 3 | SW 4 | SW 5 | SW 6 |
|---|---|---|---|---|
| Simple mode | P0 selection | P1 selection | P2 selection | P3 selection |

The state of the display screen displayed on the dot matrix display section 310 is placed in RAM 103 by the screen register M2. Table 7 shows the functions of switches SW3–SW6 corresponding to the screen register M2 when in the advanced mode. The screen register M2 is not defined in the simple mode.

TABLE 7

| M2 | Display screen register | SW 3 | SW 4 | SW 5 | SW 6 |
|---|---|---|---|---|---|
| 0 | First mode selection screen | M2 ← 1 | S selection | A selection | M selection |
| 1 | P0 – P2 selection screen | P0 selection | P1 selection | P2 selection | M2 ← 2 |
| 2 | P3, P4 selection screen | M2 ← 1 | P3 selection | P4 selection | M2 ← 3 |
| 3 | P5 – P7 selection screen | M2 ← 2 | P5 selection | P6 selection | P7 selection |

TABLE 7-continued

| M2 | Display screen register | SW 3 | SW 4 | SW 5 | SW 6 |
|---|---|---|---|---|---|
| 4 | First function screen | M2 ← 0 M2 ← 4 | M2 ← 5 | M2 ← 6 | M2 ← 7 |
| 5 | AF mode setting screen | | | AF − S | AF − C |
| 6 | Film sensitivity setting screen | Setting completed | | SV − ⅓ | SV + ⅓ |
| 7 | Exposure adjustment setting screen | Setting completed | | dSV − ⅓ | dSV + ⅓ |

Figure 16:
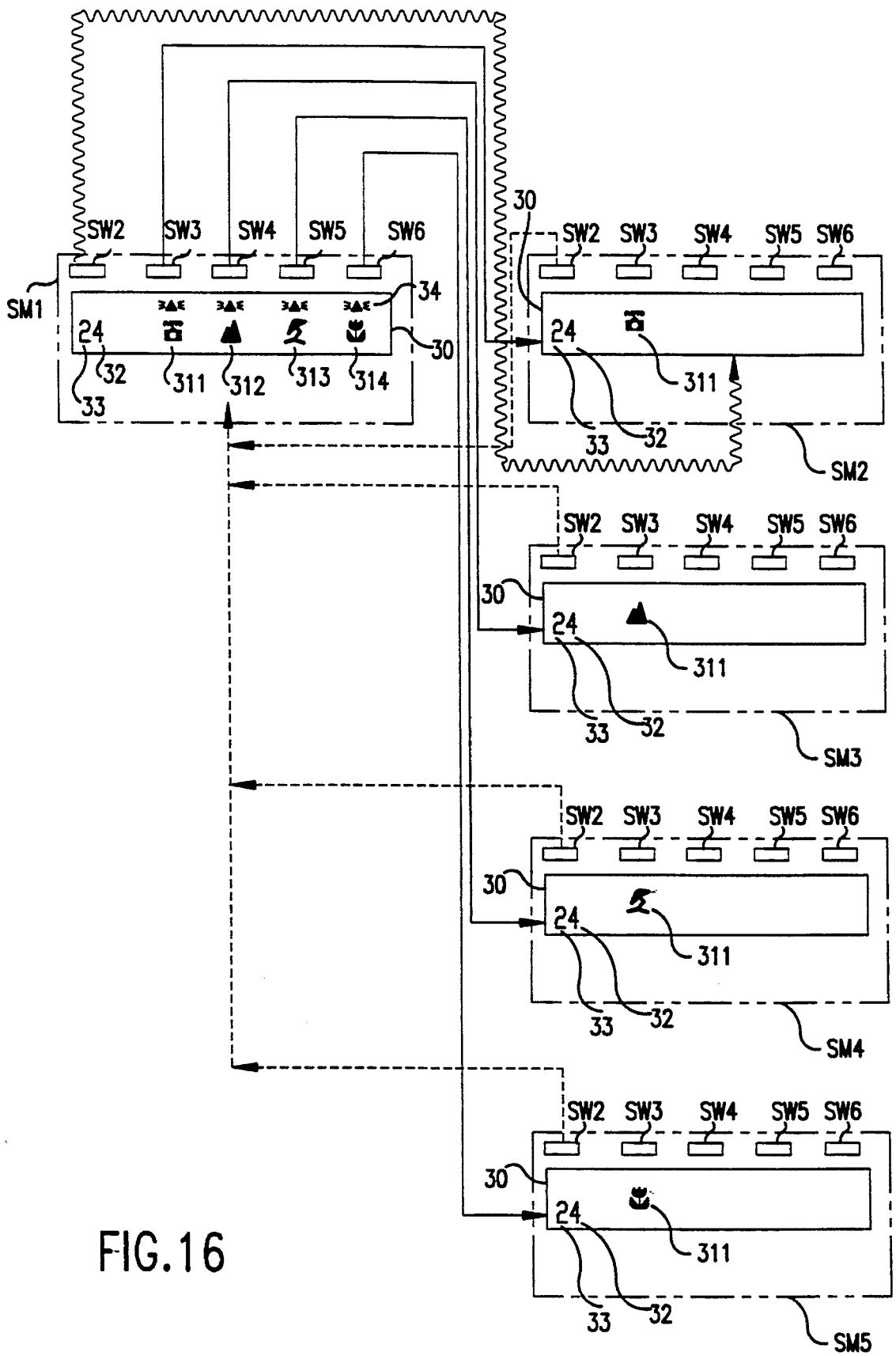
FIG. 16 is a diagram showing the corresponding relationship between the display and the switch operation in the simple mode according to an embodiment of the present invention.
Figure 17A:
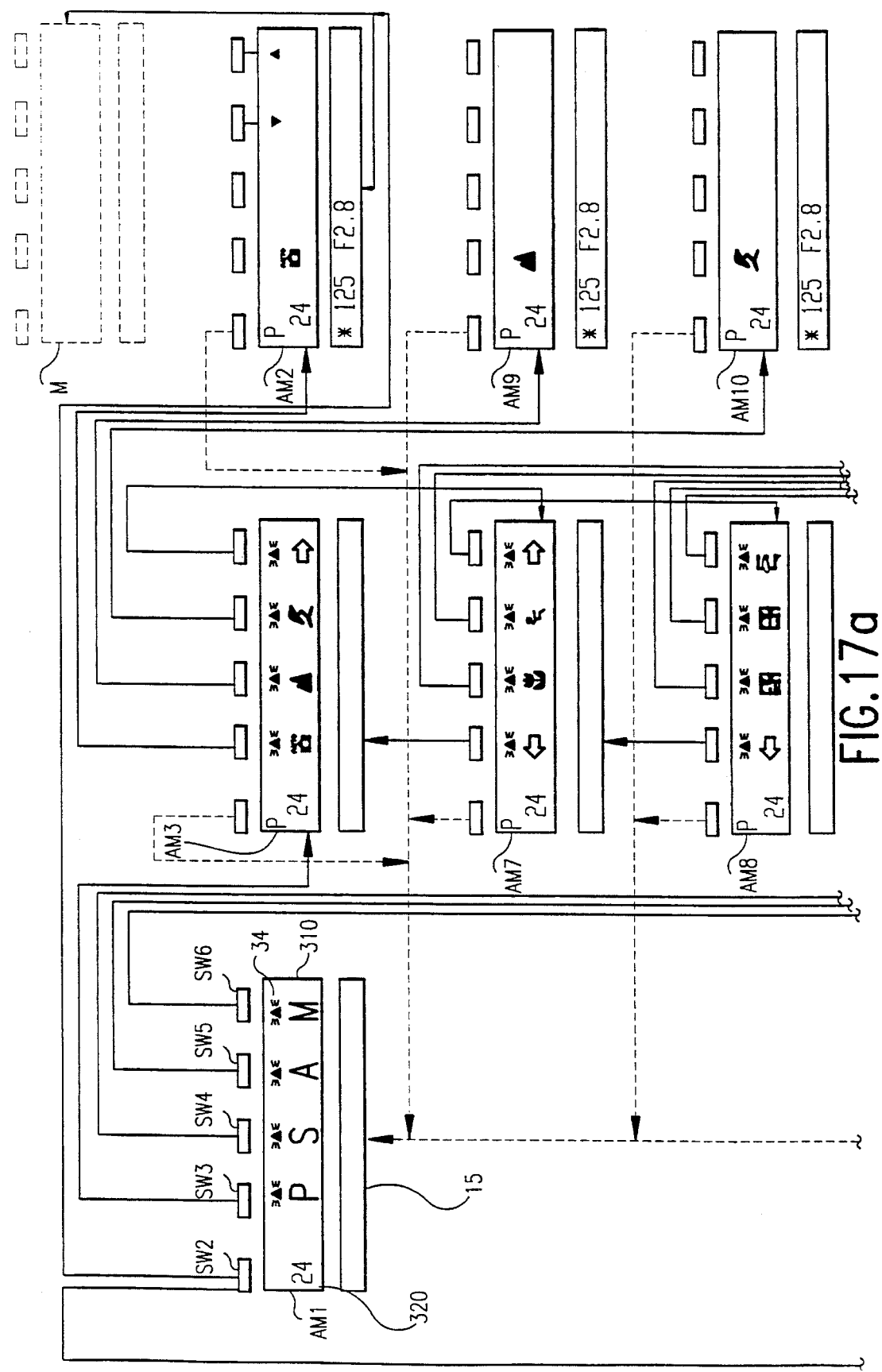
Figure 17B:
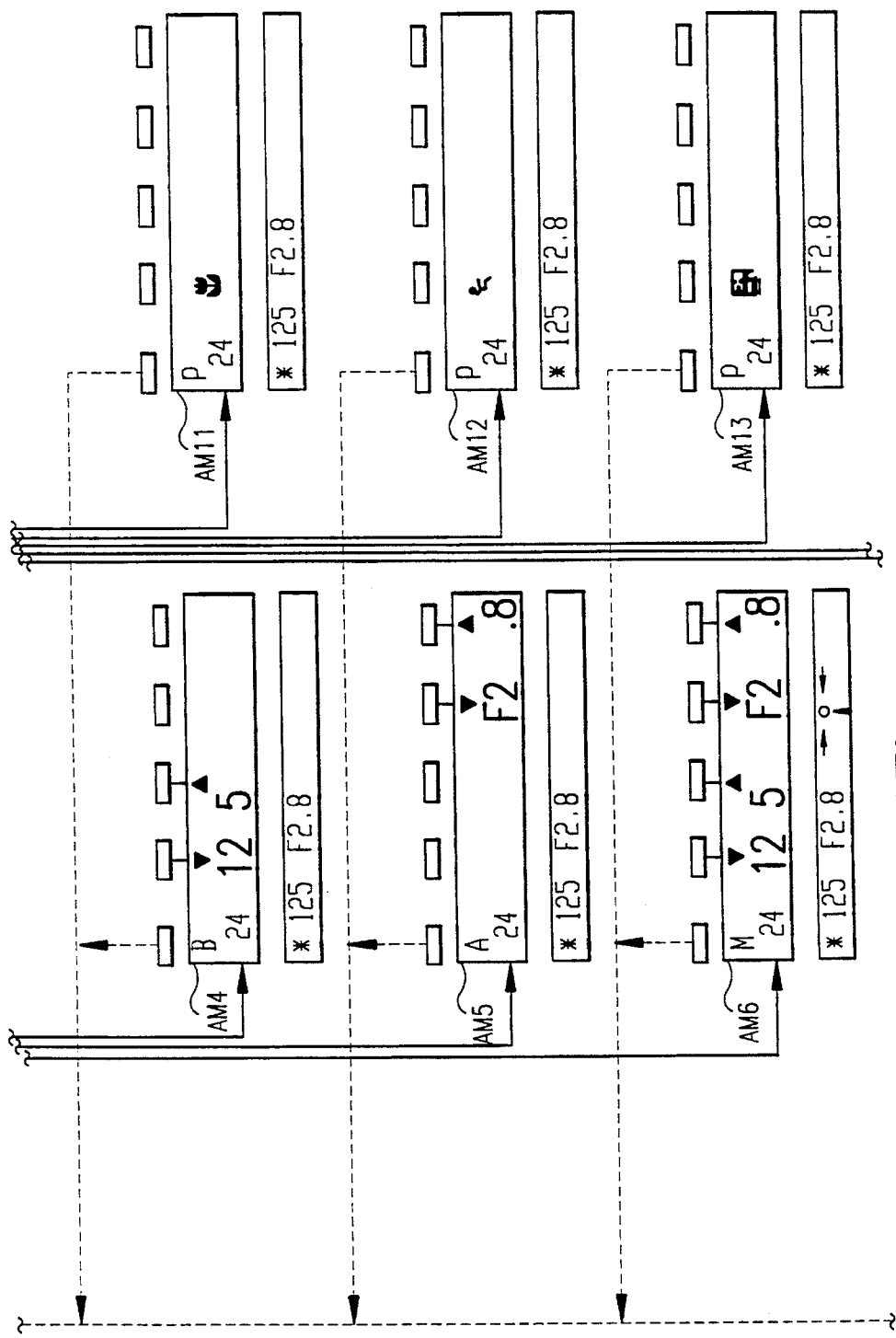
Figure 17C:
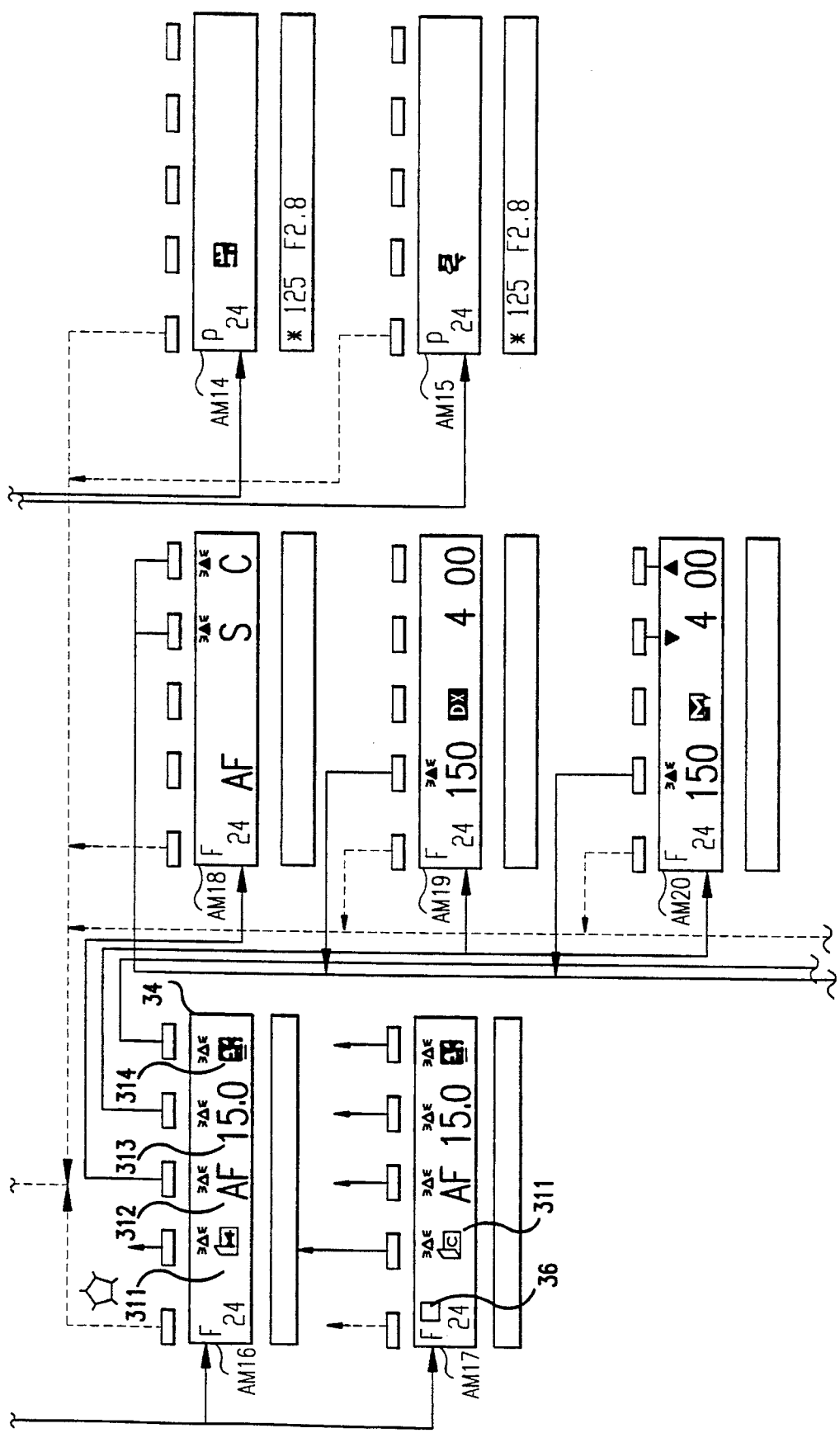
Figure 18A:
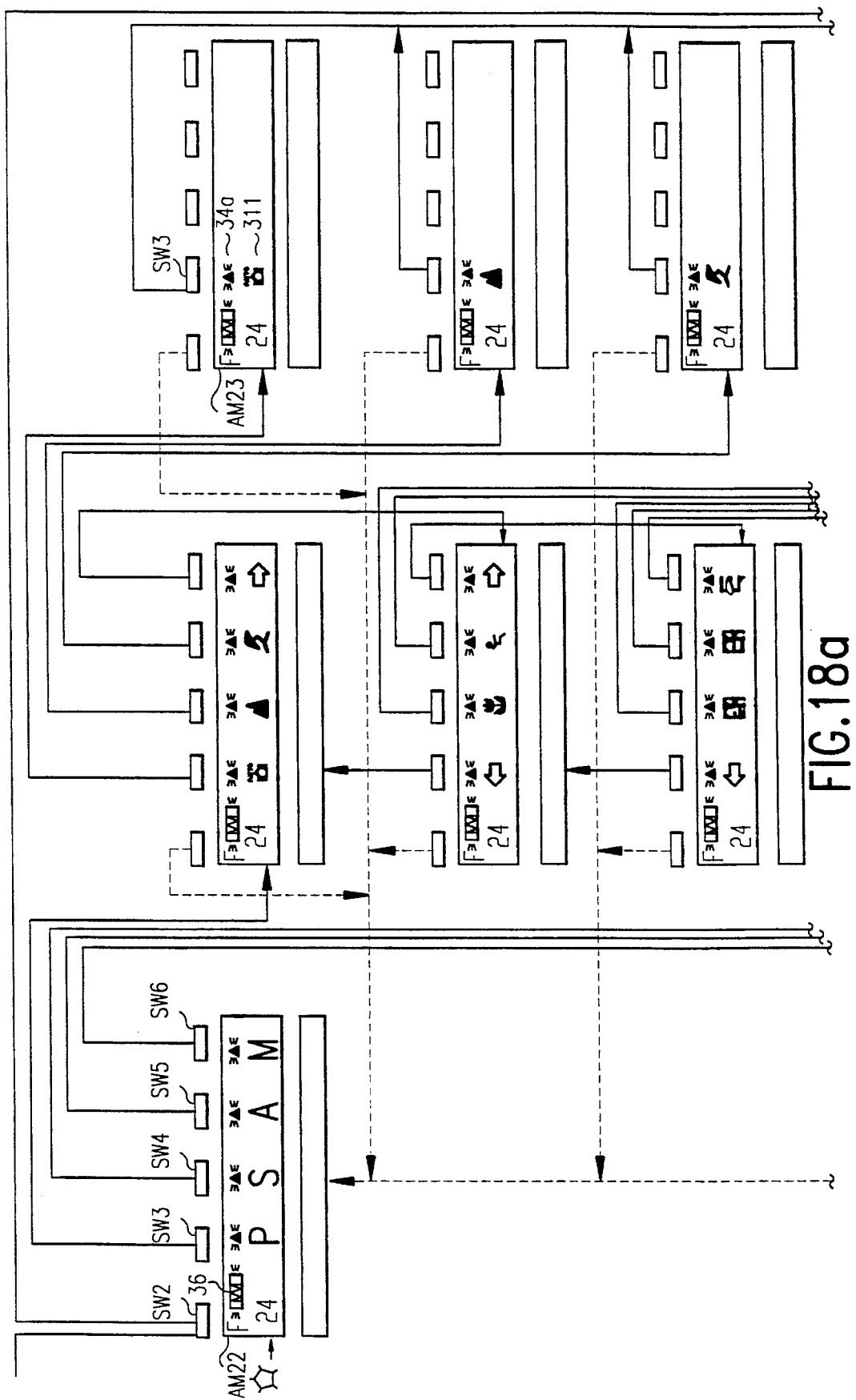
FIG. 18(a)–18(c) is an explanatory diagram showing the corresponding relationship between the display and the switch operation when the memory registration is accomplished in the advanced mode.
Figure 18B:
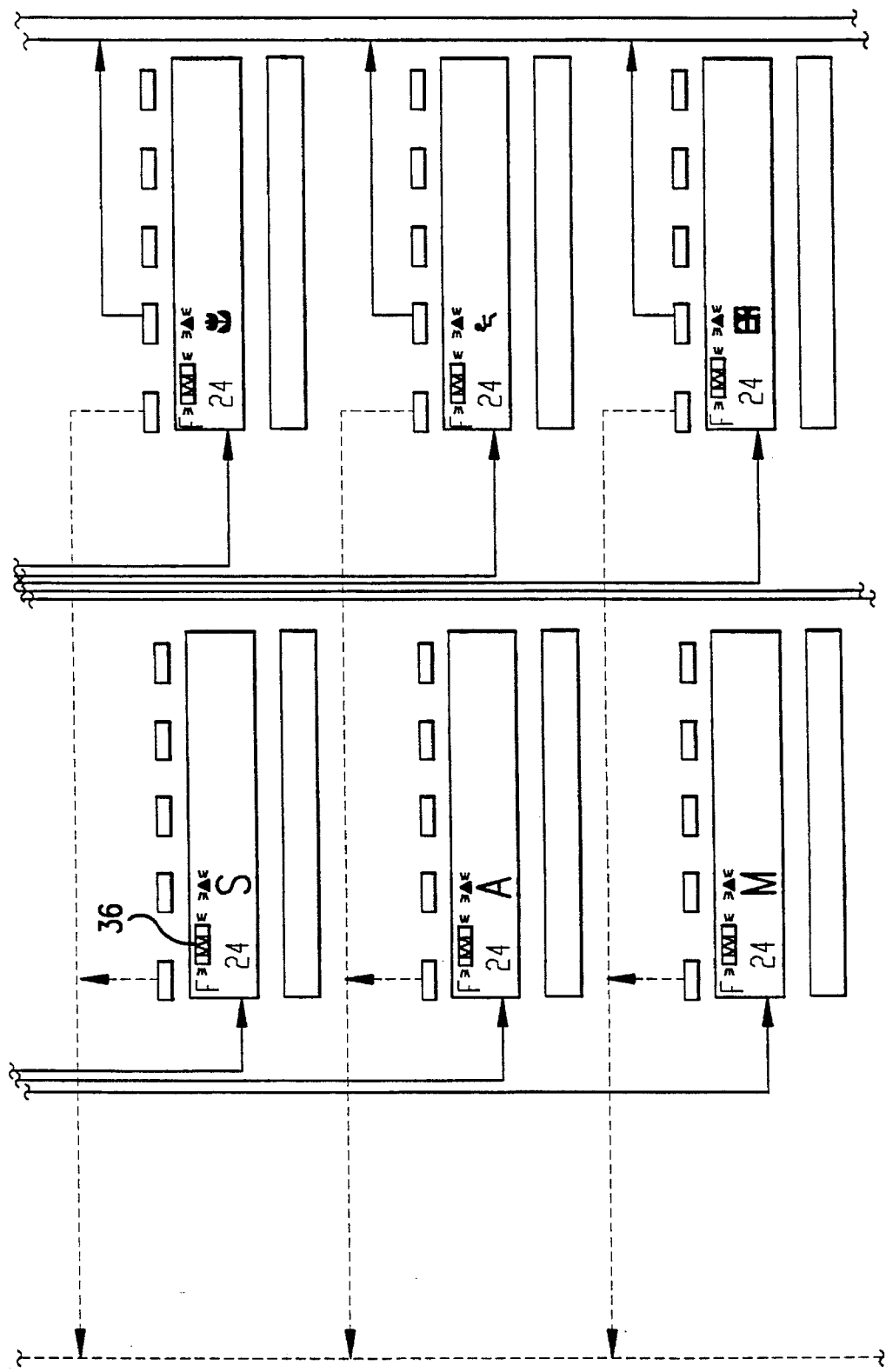
Figure 18C:
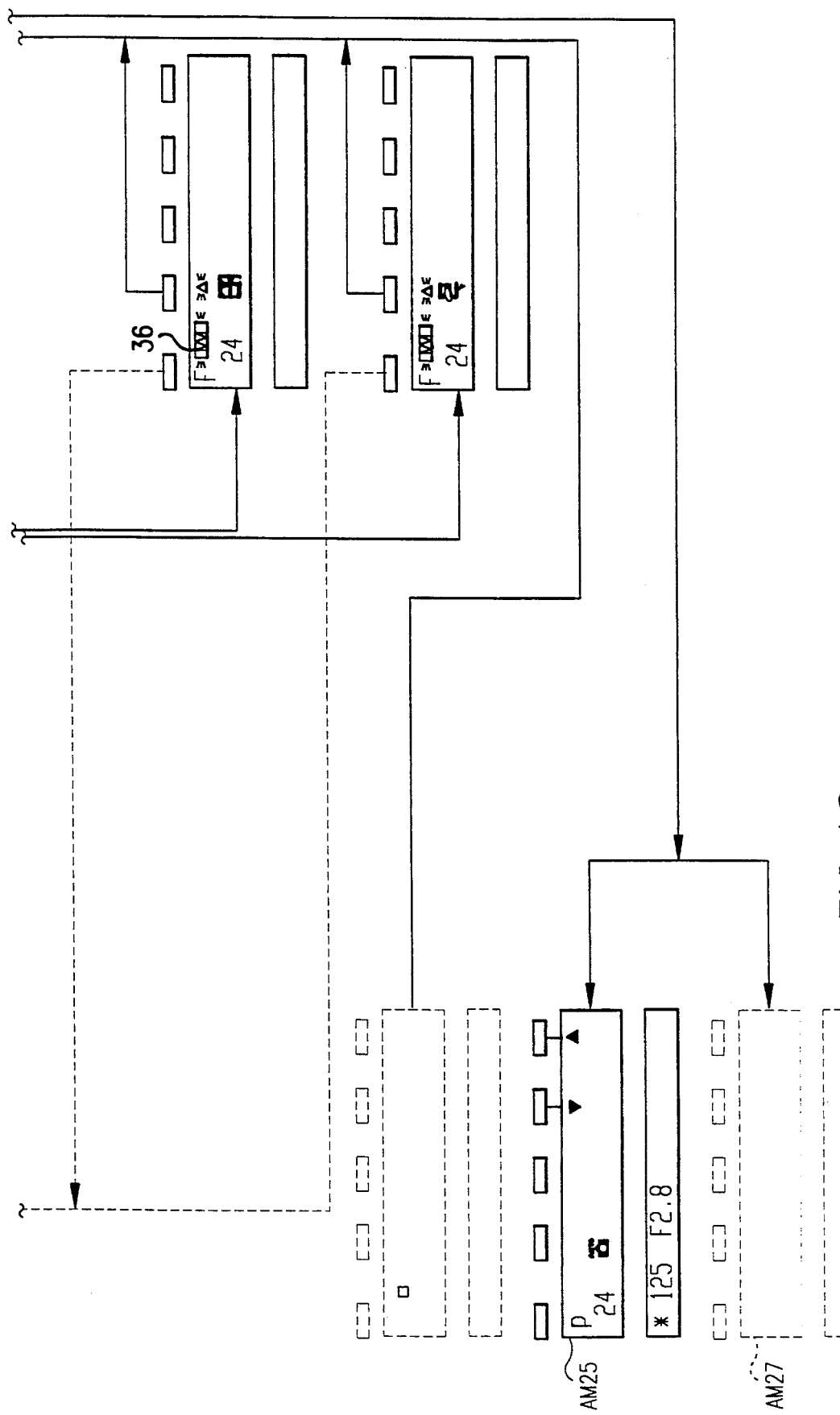

In the present embodiment, the relationship between the switch operation and the display on the display panel 30 is shown in FIGS. 16–18. FIG. 16 depicts the simple mode. In FIG. 16, small rectangular shaped blocks depict the switches SW2–SW6. FIGS. 17 and 18 depict the advanced modes. In FIGS. 17 and 18, the rectangular shaped block at the lower section of the display panel is the finder display 15. In FIGS. 16–18, the solid line indicates the selected moving location at the time when the switches SW2–SW6 are ON in each state of the display panel 30. The dotted line indicates the return to the first display state at the time when the switch SW2 is ON in each state of the second display of the display panel 30. The wavey line indicates the moving location when the switch SW2 is pushed for a certain period of time, and it is in the ON state.

In FIG. 16, SM1 depicts the mode register M0 or the first display shown in Table 2 as 1. In this mode, the graphic icons of a camera and AUTO letters, a mountain, a profile and a flower are displayed. These icons correspond to the program modes in mode register M1, including the automatic mode P0, the scenery mode P1, the portrait mode P2 and the close up mode P3, respectively. To indicate that selection of one of these modes is possible, in the present embodiment, the triangle segments in the auxiliary display section 34 flash. In the segment display sections 32 and 33, the numerals indicating the number of frames of film are displayed.

The screens SM2–SM5, in FIG. 16, depict the second display mode indicating the results of a selection of mode corresponding to one of the display blocks in the first display. The screen SM2 represents selection of the automatic mode. The screen SM3 represents selection of the scenery mode. The screen SM4 depicts the selection of the portrait mode. The screen SM5 depicts the selection of the close up mode. In the second display mode, the mode register M0 is "0". When the switch SW2 is pushed, the second display mode is canceled, and the control unit 10 returns to the first display mode. There, the display screen returns to the display screen SM1 in the first display mode. If, however, the switch SW2 is continuously pushed for a certain time (e.g., 1 second), the automatic mode of screen SM2 is displayed.

When the advanced mode is selected by switch SW0, the screen of the mode selected immediately prior is displayed on the panel display section 30. Therefore, the user can move into the implementation of picture taking in its current state, in the case that the picture taking is accomplished with that mode. However, if the mode should be changed, or, by pushing the switch SW2, which is the change operation component, it is possible to return to the initial screen AM1, shown in FIG. 17.

In the first display screen AM1 of the advanced mode, the letters indicating each selection branch of the program mode P, the shutter priority mode S, the aperture priority mode A or the manual mode M are displayed on the dot matrix display section 310. The triangle segments of the auxiliary display section 34 flash to indicate that these modes can be selected. The user is then able to select one of the modes in this state by operating switches SW3–SW6.

When the user continuously pushes the switch SW2 for more than a designated time, the display screen A2 is shown. In display screen AM2, if the user has stored a specific mode into the memory, as shown in broken line, the mode stored in the memory is displayed. If a specific mode is not stored in the memory, the automatic mode is displayed. RAM 103 is used as the memory. When the power source is cut off, however, the contents are saved into the EEPROM 16. When the power source is turned ON, the stored mode is read to RAM 103. In addition, for the maintenance of data immediately previous, the operation is the same.

When the user is in display mode of screen A1, selection of one of P, S, A, or M, using switches SW3–SW6 displays the screens AM3, AM4, AM5 or AM6, respectively. In each of the screens, the selected (P, S, A or M) letter is displayed in the mode display section 37.

In each of the screens AM4, AM5 and AM6, the shutter speed and the aperture setting are set and the selection input is completed. In the display screen AM3, an arrow mark indicates additional selection branches. If switch SW6 is pushed, screen AM7 is displayed. If the switch SW6 is further pushed in screen AM7, screen AM8 is displayed. In screen AM8, when the switch SW3 is pushed, the previous screen AM7 is displayed. When switch SW3 is pushed again, screen AM3 is displayed. When an icon other than the arrow mark is selected in screens AM3, AM7, and AM8, the screens AM8, AM9, AM10, AM11, AM12, AM13, AM14 or AM15 corresponding to the selected icon are displayed. These screens correspond to P0 through P7 set in the mode register M1.

If the switch SW2 is pushed in screen A1, the function selection screen AM16 or AM17 is displayed. When the user does not accomplish the desired mode selection, screen AM16 is displayed. When the user accomplishes the selection (the memory mode display section 36 is flashing), screen AM17 is displayed. In screen AM17, when the switch SW3 corresponding to the display block 311, is pushed, all registered desirable modes up to that point are cleared and screen AM16 is displayed. The display blocks 312–314 also function with the screen AM16.

In the display screen AM16 when the display block 311 corresponding to switch SW3 is selected, screen AM22, shown in FIG. 18 is displayed. The memory registration of the mode is accepted. When the display blocks 312, 313 and 314 corresponding to switches SW4–SW6 are selected, screens AM18, AM19, AM20 and AM21 are displayed. These screens identify input data. For example, in screen AM18, either the single mode S or the continuous mode C at the time of AF (automatic focus) can be selected by pushing switch SW5 or SW6, respectively. The film sensitivity setting can be selected in screens AM19 and AM20. Automatic operation by DX can be selected in screen AM19. The exposure adjustment is accomplished in screen AM21. The film sensitivity setting is automatically switched over, depending on the DX readability. The setting is established and the setting value is stored in the memory of RAM 103 by pushing the switch corresponding to the display block displaying each symbol. The setting of the numerical values using the corresponding switch is accomplished for each of the display screens. This value is maintained thereafter unless a change is made. These values are saved in the EEPROM 16 when the power source is cut off.

In FIG. 18, the selection of each mode to be registered is accomplished in the initial screen AM22 of registration. The display on the screen is same as in screen AM1, except that the memory mode display section 36 is flashing. In this instance, the mode selection is accomplished in the identical manner as the mode selection in FIG. 17 described previously. In other words, one of P, S, A or M is selected, and the mode displayed on the screen is registered by pushing the switch corresponding to the flashing triangle segment 34. For example, when the display screen AM23 is finally selected, if the switch SW3 is operated while the triangle segment 34a of the auxiliary display section 34 is flashing, the automatic mode is registered. The same can be applied for other modes.

When the registration is completed, the control unit moves to the exposure mode immediately before the registration operation is accomplished. In addition, if the switch SW2 is continuously pushed in the screen AM22, the control unit moves to the mode of display screen AM24 where the registration (storage) is accomplished. In addition, it moves to the automatic mode of screen AM25 in cases prior to the registration.

Figure 8:
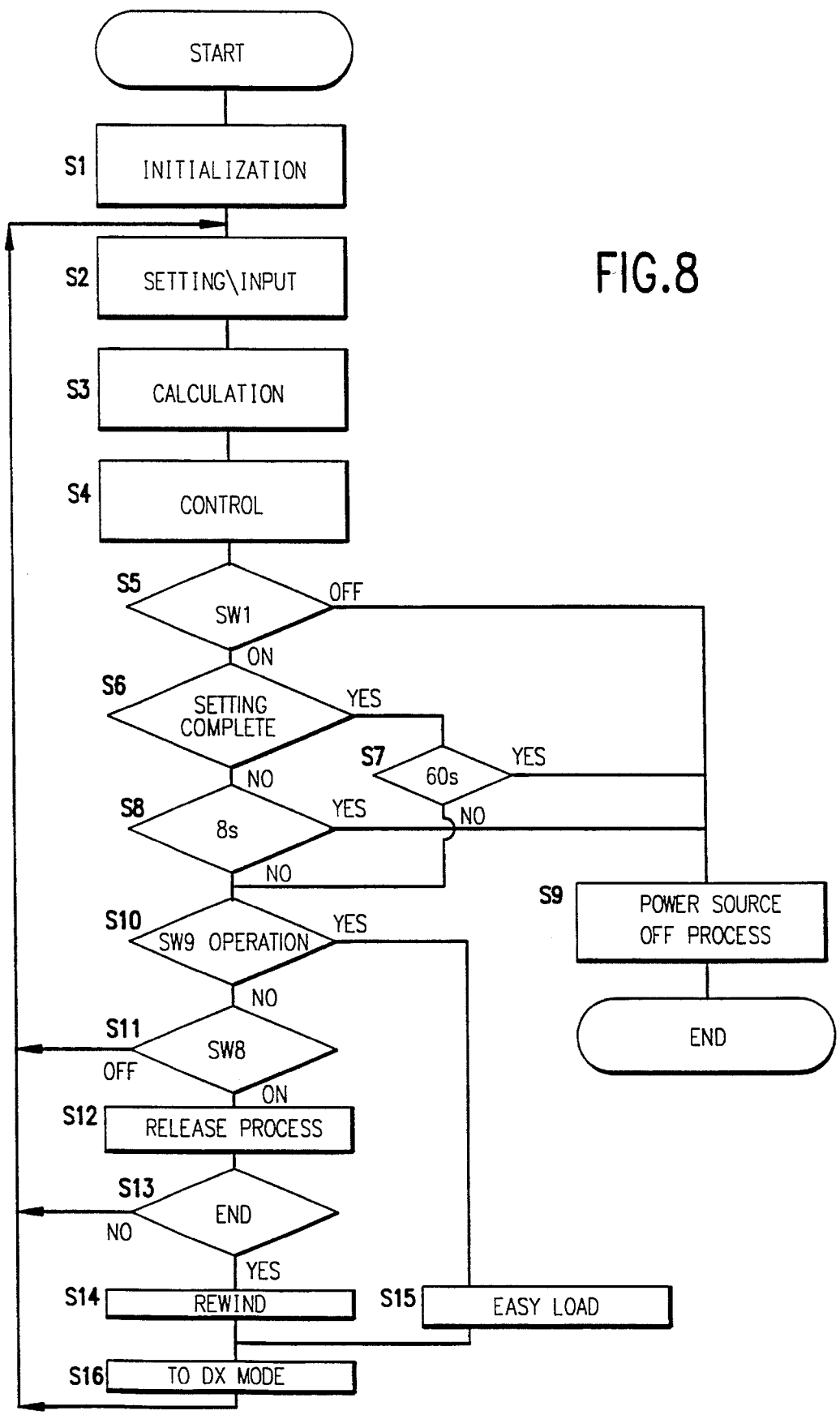
FIG. 8 is a flow chart depicting the main routine of the control device according to an embodiment of the present invention.

The input selection of the mode, described above, the input selection of the function and mode registration are further explained hereafter, with reference to the flow charts. FIG. 8 is a flow chart depicting the main routine of the control unit 10. When either switch SW2 or SW7 is pushed, an interruption comes into the control unit 10 in the stand by mode (only a minute quantity of electric current is flowing), and the initialization process of step S1 is started.

In step S1, initialization of the control unit 10 is accomplished. This includes setting the power source circuit 11 to ON, connecting electricity to the total circuit, setting the main clock of the control unit 10 to ON. Data is read from the EEPROM 16 and transferred to the designated RAM 103 in the control unit 10.

In step S2, the switch for controlling input to the control unit 10 is activated, the setting operation is accomplished, the output from the photometric circuit 12, the telemetric circuit 13, or DX contact point 14, are input, and are stored in the designated RAM 103 of the control unit 10. In addition, in the present embodiment, a power source check is accomplished in this step, and it is possible to accomplish a warning, if there is an approximately designated voltage. This warning, for example, can be displayed from the characters, shown in FIG. 7, to the display panel 30, for example, by designating the address DC and DD patterns, and the address D6 and D7 patterns. In addition, in some cases, it is possible to prohibit the shutter release.

In step S3, the exposure or distance calculation is accomplished in accordance with the data from RAM 103 obtained in step S2. Additionally, in the present embodiment, when the output from the photometric circuit 12 indicates low luminosity, it is possible to provide a warning recommending the use of a flash.

In step S4, AF controls the first motor control device 17, the display control driving the display device in the finder 15 or LCD driver 20 are completed.

In step S5, the control unit determines whether the main switch SW1 is ON or OFF. When the switch SW1 is ON, the operation of the control unit 10 proceeds to step S6. When the switch SW1 is OFF, the operation of the control unit 10 proceeds to step S9.

In step S6, the setting is checked. When a flag indicates that the setting operation is pending, the operation of the control unit 10 proceeds to step S7. When the flag indicates the completion of the setting operation, the operation of the control unit proceeds to step S8. In step S7 or S8, the control unit 10 determines whether the power source maintenance timer has exceeded the designated value. When a switch is not operated, the power source maintenance timer continues to operate. When the time exceeds a designated value, the operation of the control unit 10 proceeds to step S9. When one of the switches SW2–SW7 is activated and set to ON, the timer is cleared and the timer does not exceed the designated value. In such a case, the control unit proceeds to step S10. In step S7, the designated value is set at 60 seconds. The power source maintenance timer is set at 60 seconds to prevent the power source from turning OFF during the setting operation. In step S8, the designated value is set at 8 seconds. In the non-setting mode after the setting is completed, the power source maintenance timer is set at 8 seconds to save electric power. If a user is accustomed to the setting operation, the setting can be accomplished quickly, and the execution screen will be displayed, therefore, the power source maintenance time can be shortened.

In step S9, the data stored in the memory (i.e., RAM 103) is saved in the EEPROM 16 after the power source is cut off. The power source control circuit 11 is driven, and the power source OFF process is completed.

In step S10, the back cover switch SW9 is checked. When the back cover is closed, the switch operation is detected, the operation of the control unit proceeds to step S15, and the automatic film installation function is performed. When the back cover switch SW9 is open, or after the easy load function is completed and the cover closed, the starting up operation of switch SW9 is not detected, and the control unit 10 proceeds to step S11.

In step S11, the ON-OFF mode of the shutter release switch SW8 is checked. If the switch SW8 is OFF, the operation of the control unit 10 returns to step S2, and the process is repeated. If the switch SW8 is ON, the operation of the control unit proceeds to step S12. In step S12, the shutter release process is accomplished by controlling the second motor control circuit 18 or by controlling the exposure control circuit 19.

In step S13, the film supply is checked. When one frame of film is not wound, the film is considered to be at the end. The operation of control unit 10 proceeds to step S14 to perform the rewinding operation. When the winding of one frame of film is possible, the film is not at the end, and the control unit 10 returns to step S2. In step S14, the rewinding operation is accomplished using a supply mechanism (not shown) by driving the second motor control circuit 18. When the rewinding operation is completed, the operation of the control unit 10 proceeds to step S16.

In step S15, the automatic film installation is achieved when the winding of the designated quantity of film is performed by driving the second motor driving device. Upon completion, the operation of the control unit 10 proceeds to step S16.

By proceeding to step S16 from steps S14 or S15, and at step S16, the manual ISO setting is cleared. A switch over to the DX mode is completed preventing manual setting of the film sensitivity. At this time, the initial value of the film sensitivity is set at ISO 100, the most standard sensitivity. When switch over to DX mode is made, however, the initial value setting itself does not become valid. It should let it appear as the initial value at the time when the setting screen becomes manual. The operation of the control unit 10 then returns step S2, and the process is then repeated.

Figure 9:
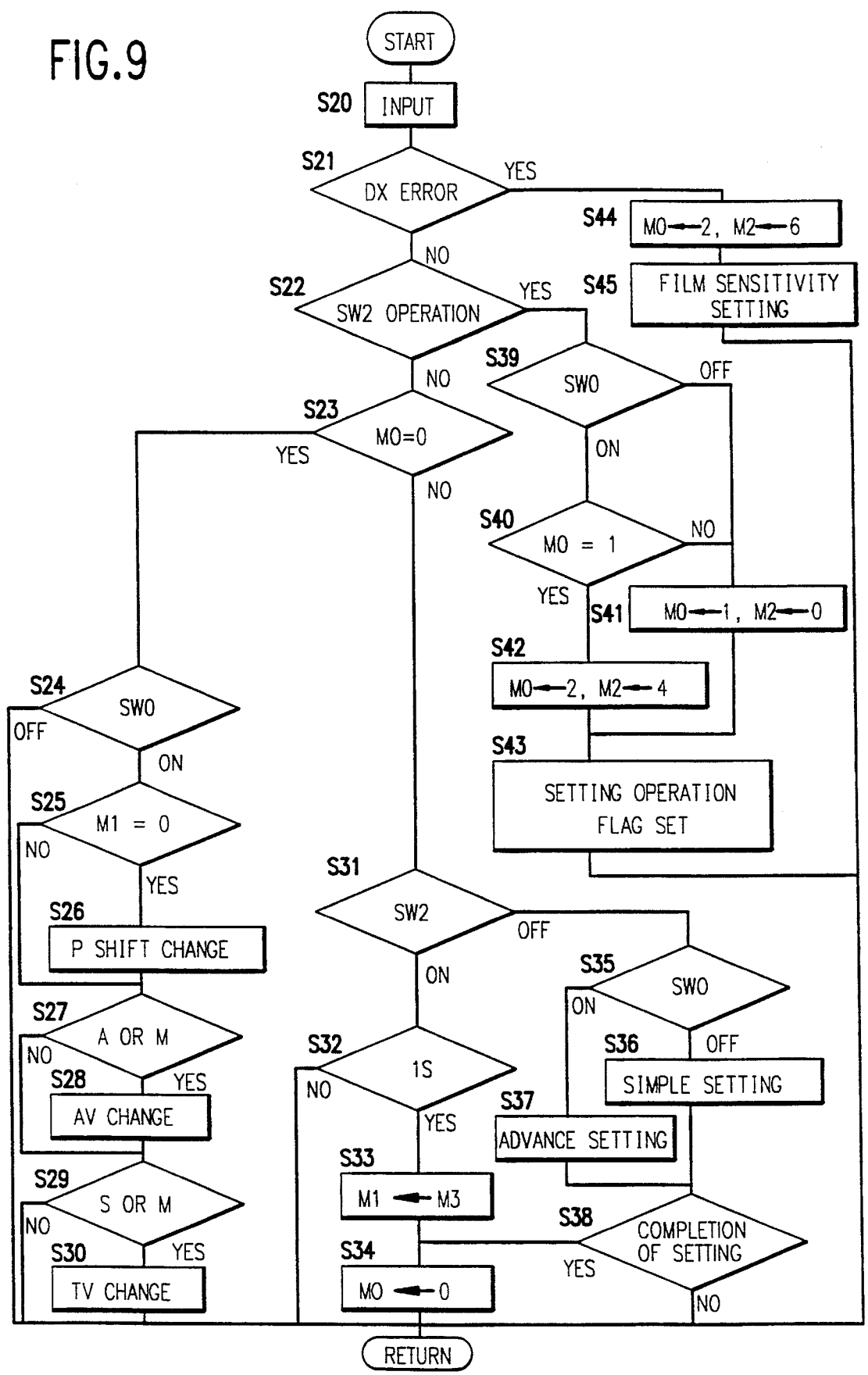
FIG. 9 is a flow chart depicting an example of the setting process routine of the main routine.

FIG. 9 depicts part of the setting process subroutine when the setting and input processes of step S2 in FIG. 8 are performed. In step S20, if the input of switches SW2–SW7 are received and one of the switches is set at ON, the power source maintenance timer, checked at step S7 or step S8 of FIG. 8, is cleared. In step S21, the film sensitivity data is read from the conductor section of the film from DX contact point 14. The DX error is also checked. When the DX contact point 14 determines that the film is not the DX film (DX error), a DX error flag is set, and the control unit 10 proceeds to step S44. When the DX contact point 14 detects DX film, the control unit 10 proceeds to step S22.

Figure 11:
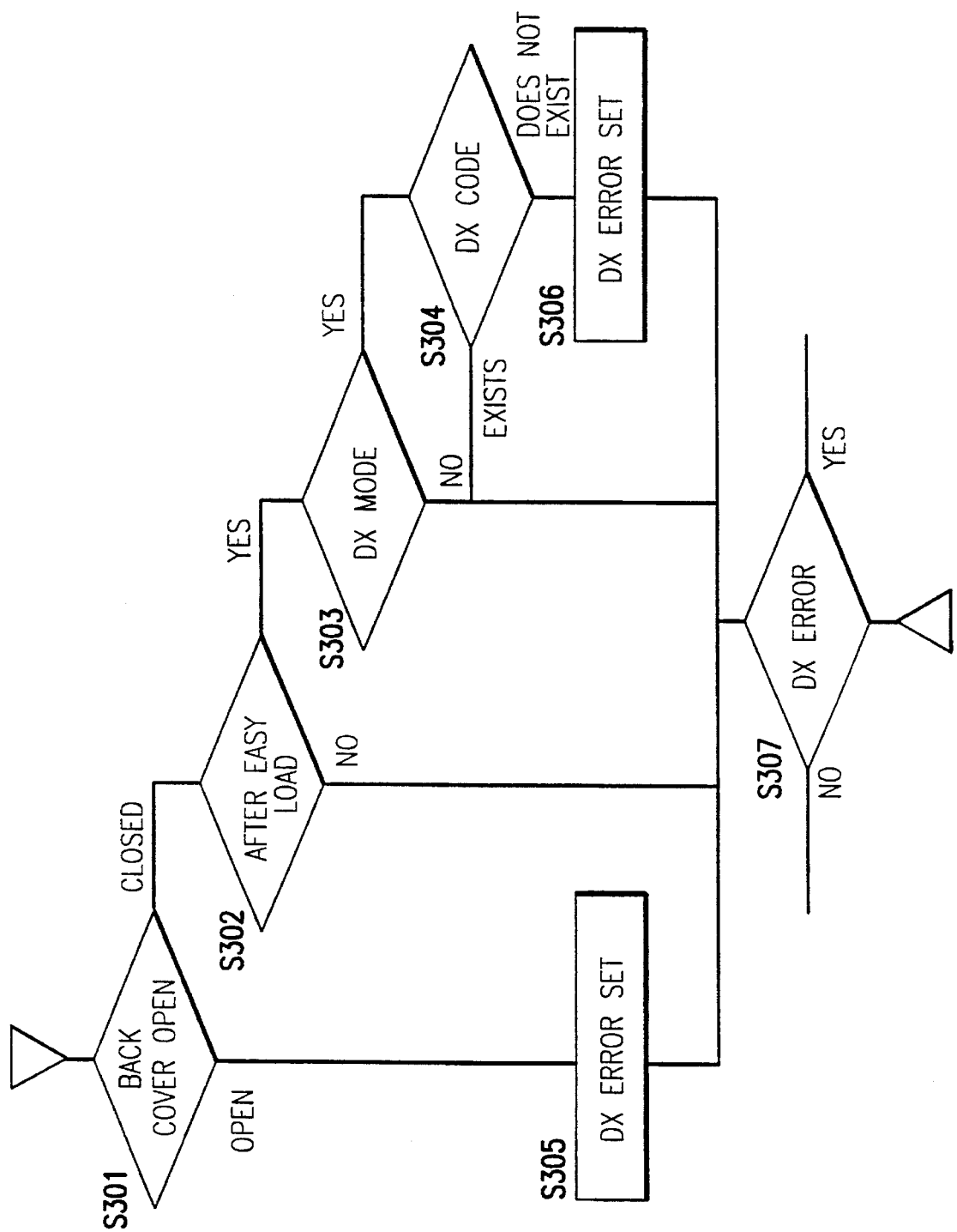
FIG. 11 is a flow chart depicting the DX error determination in the setting process routine of FIG. 9.

The detection of the film in step S21 is performed according to the steps, for example, shown in FIG. 11. Initially, the open/close state of the back cover is checked in step S301. In step S302, the easy load or automatic film installation is performed, and the existence of the film is checked. In step S303, the DX mode is checked. If the film sensitivity is switched over to the manual setting, a warning is not necessary. In step S304, the film sensitivity data is read from DX contact point 14. When the DX film is not present, all of the terminals are set at high level. When the DX film is present, the data in accordance with the code can be read. In addition, even if some types of data can be read, if they are the data other than the coded data, it is determined that it is not DX film. The DX error flag is then set and should be reset when the back cover is opened.

In step S22, the operation of switch SW2 is checked. If the switch SW2 is set at ON, the operation of the control unit 10 proceeds to step S39. When the switch SW2 is set at OFF or switch SW2 is continuously pushed even though the switch SW2 is set at ON, the operation of the control unit 10 proceeds to step S23. In step S23, the mode register M0 is checked. If the mode register M0 is 0 and in the non-selection mode (implementation screen), the operation of the control unit 10 proceeds to step S24. If M0 is 1 or 2 and in the selection mode, the operation of the control unit 10 proceeds to S31.

In step S24, ON-OFF mode of the switch SW0 is checked. If the switch SW0 is set to ON indicating the advanced mode, the operation of the control unit 10 proceeds to step S25. If the switch SW0 is set at OFF, indicating the simple mode, the operation of the control unit 10 returns to the flow chart depicted in FIG. 8. In other words, nothing is processed in the implementation screen of the simple mode. In step S25, the program mode is checked. If the control unit 10 is in the program mode and M1 is 0, the operation of the control unit 10 proceeds to step S26, and in other cases, the operation proceeds to step S27.

In step S26, the setting of the program shift quantity is performed. The program shift quantity may include a combination parameter such as the preset aperture, film sensitivity and the shutter speed. If M1= 0, as shown in Table 5, by detecting the operation of SW5, the program shift quantity is reduced by ½ step increments. By detecting the finishing of SW6, the programmed shift quantity is increased in ½ step increments.

In step S27, the control unit 10 determines whether the A (aperture priority) mode or M (manual) mode is selected. When the mode register M1≧9 in A mode or M mode, the operation of the control unit 10 proceeds to step S28. On the other hand, when the mode register M1≦in P (program) mode or S (shutter priority) mode, the operation proceeds to step S29.

In step S28, the AV (aperture) value is changed. When the mode register M1 is 9 or 10, as shown in Table 5, the aperture value (AV) setting is decreased by ½ step increments at the operation of the switch SW5, and the aperture value setting is increased in ½ step increments at the operation of the switch SW6. In step S29, the S mode or M mode is checked. When S mode is (M1=8) or M mode is (M1=10), the operation of the control unit 10 proceeds to step S30. When P mode is (M1≦7) or A mode is (M1=9), the operation returns to the flow chart depicted in FIG. 8.

In step S30, the TV (shutter speed) value is changed. When the mode register M1 is 8 or 10, as shown in Table 5, the shutter speed (TV) setting is decreased in ½ step increments by operating switch SW3. The shutter speed setting is increased by ½ step increments by operating SW6.

In step S31, ON-OFF mode of switch SW2 is checked. If the switch is set to ON, the operation of the control unit 10 proceeds to step S32. If the switch is set at OFF, the operation proceeds to step S35. In step S32, the control unit determines whether more than one second has passed. When switch SW2 is pushed for more than one second, the operation of the control unit 10 proceeds to step S33. If the switch SW2 is pushed less than one second, then the operation returns to the flow chart depicted in FIG. 8.

In step S33, the mode setting details stored in the mode register M3 for memory are transferred to the mode register M1. If nothing is stored in the memory, the initial value of 0 is transferred, and the control unit is set to the automatic mode (PO). If the desired mode is set, it is switched over to the mode in accordance with the data stored in the mode register M3 for memory, and the operation of the control unit proceeds to S34. In step S34, the mode register M0 is set at 0 the operation of the control unit 10 returns the flow chart depicted in FIG. 8.

In step S35, ON-OFF mode switch of SW0 is checked. If the switch SW0 is set at ON, the control unit 10 is operating in the advanced mode, and the operation proceeds to step S37. If the switch SW0 is set at OFF, the control unit 10 is operating in the simple mode, and the operation of the control unit 10 proceeds to step S36.

In step S36, the simple mode, shown in M1=0–3 of Table 3, is selected. Specifically, when the operation of switch SW3 is detected, 0 is stored in the mode register M1, and the control unit 10 is set to the automatic mode. When the operation of switch SW4 is detected, 1 is stored in M1, and the control unit 10 is set to the scenery mode. When the operation of switch SW6 is detected, 3 is stored in M1, and the control unit is set to the close up mode. When no setting operation is accomplished, the operation of the control unit 10 proceeds to step S38, while the flag indicating the setting operation is not complete is set.

Figure 12:
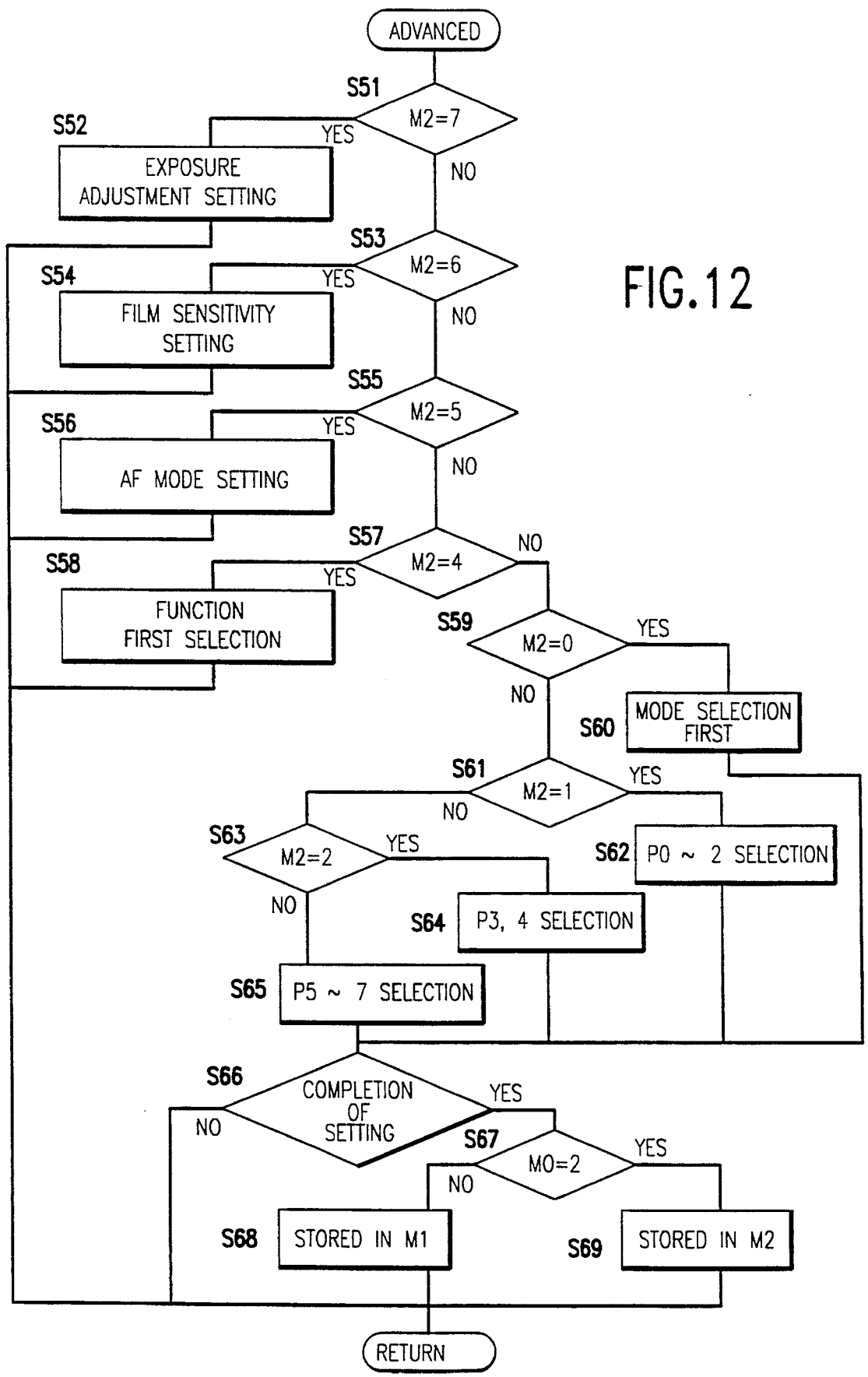
FIG. 12 is a flow chart depicting an example of the advanced mode setting routine being called at the sub-routing advanced mode setting in the setting process described above.

In step S37, the sub-routine for the advanced mode, shown in FIG. 12, is performed and the selections for advanced mode, shown in Table 7, are performed. The setting is accomplished using switches SW3–SW6. When some sort of setting is made, the flag indicating the setting operation should be reset. When no setting operation is performed, the operation of the control unit 10 proceeds to step S38, while the flag indicating the setting operation is pending is set. In step S38, the setting operation is checked. When the flag indicating the setting operation is set (i.e., no mode has been set), the operation of the control unit 10 returns to the flow chart of FIG. 8. If the flag indicating the setting operation is reset (i.e., a mode has been set), the operation of the control unit proceeds to step S34.

In step S39, the operation of switch SW0 is checked. If switch SW0 is set for the advanced mode, the operation of the control unit proceeds to step S40. If it is set to the simple mode, the operation of the control unit proceeds to step S41. The mode register M0 is set at 1 and at the same time, the register M2 is set at 0. The operation then proceeds to step S43. When the advanced mode is selected, the operation of the control unit 10 proceeds to step S40. At step S40, the present mode of the mode register M0 is checked. If M0 is set to 1, the operation proceeds to step S42, M0 is set to 2, and at the same time, M1 is set to 4. If M0 is set to 0 to 2, the operation proceeds to S41, and M0 is set to 1. At the same time, M2 is set to 0.

Proceeding to step S43 from steps S41 or S42, the flag indicating that the setting operation is pending is set, and the operation of the control unit 10 returns to the flow chart depicted in FIG. 8. If the operation of switch SW2 is checked after operating the menu button, in the simple mode, the mode register M0 is always set at 1. In the advanced mode, when the operation is detected after pushing the button, the mode register M0 is changed from 1 to 2. Then, the selection mode, shown in Table 2, is replaced with the function selection mode. And, in either case, the flag indicating the setting operation is pending is set. At this time, if the menu button is pushed even though it is the implementation screen, this is indicating that it is changed to the setting screen without fail. In addition, if the operation moves to step S34 from step S33, or if it moves forward to step S34 after the setting is completed, with the movement of the automatic default jump, the mode register M0 is switched to 0. Therefore, it is switched to the execution screen.

Figure 10:
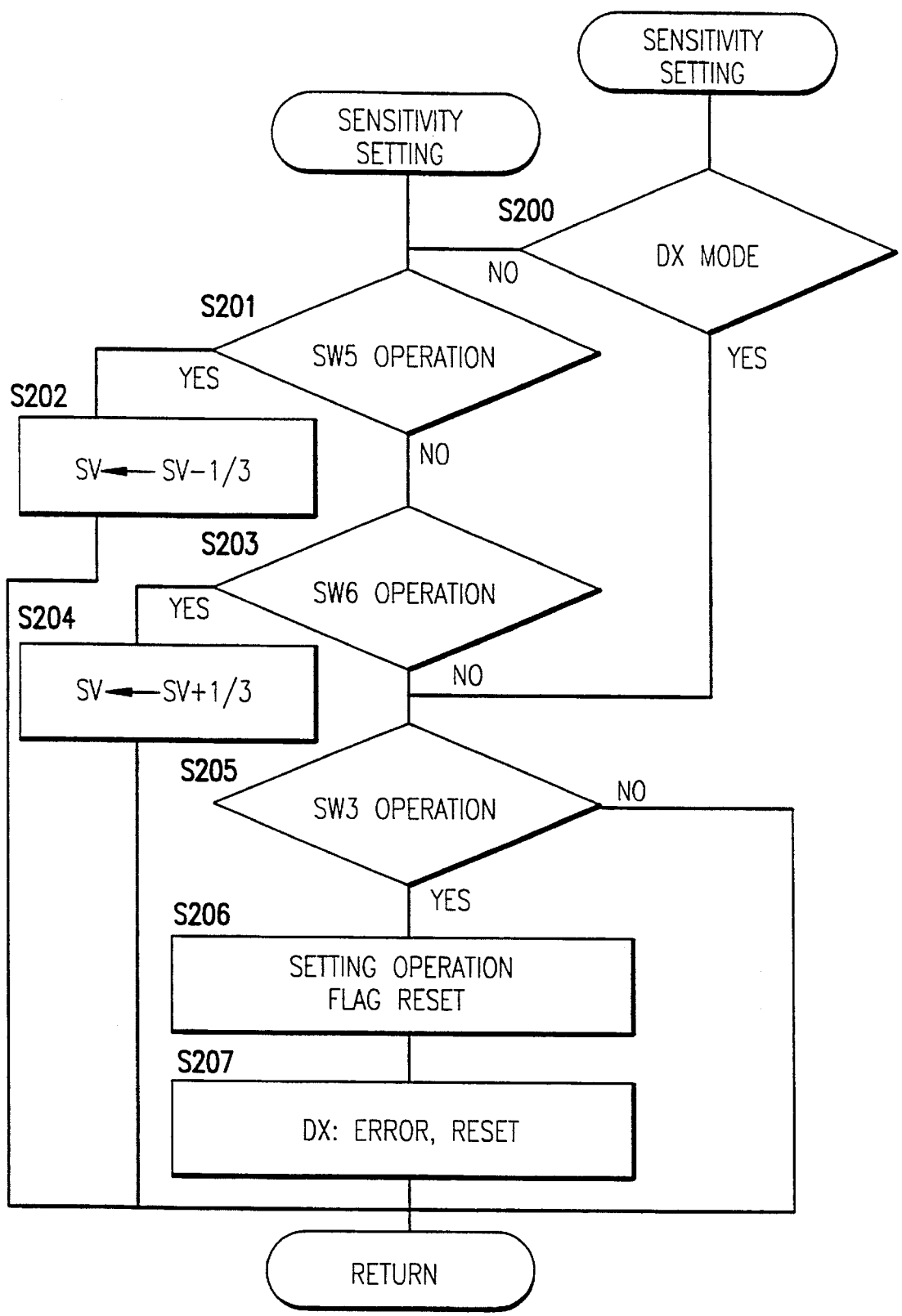
FIG. 10 is a flow chart depicting an example of the film sensitivity setting process routine of the setting process routine of FIG. 9.

In step S44, the mode register M0 is set to 2, and the screen register M2 is set to 6. In step S45, the film sensitivity setting sub-routine shown in FIG. 10 starting at step S201 is performed. FIG. 10 is a flow chart depicting the film sensitivity setting sub-routine. This refers to the situation when M2=6. In step S201, the operation of switch SW5 is detected. If switch SW5 operation is detected, the operation of the control unit 10 proceeds to step S202 where the film sensitivity SV is reduced by ⅓ step increments. In step S203, the operation of step SW6 is detected. The film sensitivity SV is then increased by ⅓ step increments in step S204. In step S205, the operation of switch SW3 is detected. If the operation of switch SW3 is detected indicating the setting operation is completed, the flag indicating the setting operation is pending is reset in step S206. The DX error flag is reset in step S207. The operation of the control unit 10 returns from the sub-routine shown in FIG. 10 to the sub-routine shown in FIG. 9 at step S45, then to the routine shown in FIG. 8.

If DX error is detected, the operation of the control unit 10 proceeds to steps S44 and S45. The mode register M0 is set to 2 without fail. The screen register M2 is set to 6, switching to the film sensitivity setting screen, and the manual film sensitivity setting is possible. When the manual film sensitivity setting is completed, the DX error flag is reset. The operation of the control unit 10 then proceeds through steps S22, S23, S31, S35, S36 or S37, S38 and S34 completing the setting operation.

FIG. 12 depicts the sub-routine of the advanced mode setting routine of step S37, shown in FIG. 9. The selections shown in Table 7 are accomplished at this time with switches SW3–SW6. In step S51, the control unit determines whether the screen register M2 is set to 7.

When M2 is set to 7 and the screen displays the exposure adjustment setting screen, the operation of the control unit 10 proceeds to step S52, and in the cases other than the above, the operation proceeds to step S53.

In step S52, shown in M2=7 row of Table 7, the exposure adjustment setting is accomplished. When the operation of switch SW5 is detected, the exposure adjustment quantity dSV is reduced by ⅓ step increments. When the operation of switch SW6 is detected, the exposure adjustment quantity dSV is increased by ⅓ step increments. When the operation of switch SW3 is detected, the control unit determines that the setting operation is complete, and the flag indicating the setting operation is pending is reset. The control unit does not respond to the operation of switch SW4. In the case that any type of operation is not accomplished, or it is not valid, the operation of the control unit 10 returns to the flow chart depicted in FIG. 9 while the flag indicating the setting operation is pending is set.

In step S53, the control unit 10 determines whether M2 is set to 6. When M2 is set to 6, the display panel displays the film sensitivity setting screen, and the operation of the control unit 10 proceeds to step S54. In the cases other than the above, the operation proceeds to step S55.

In step S54, shown in M2=6 row of Table 7, the film sensitivity setting is completed. The film sensitivity is set in the same manner as step S45 of FIG. 9 and the film sensitivity setting sub-routine of FIG. 10 is performed. The control unit 10 will respond to operation of switches SW3, SW5 and SW6 here. However, the control unit does not respond to operation of switch SW4. In the case that any type of operation is not accomplished, or it is not valid, the program returns while the flag indicating the setting operation is pending is set. The sub routine of FIG. 10 is performed, starting with step S200. At step S200, DX mode is checked. If it is the DX mode in which DX film is mounted, the operation of the control unit proceeds to step S205. Thus, it becomes possible to confirm the setting value only with DX film.

In step S201, the operation of switch SW5 is checked. If the operation of the switch SW5 is detected, the operation of the control unit 10 proceeds to step S202, and the film sensitivity SV is reduced by ⅓ step increments. In step S202, the operation of switch SW6 is checked. If the starting of SW6 is detected, the operation proceeds to step S204, and the film sensitivity SV is increased by ⅓ step increments.

In step S205, the operation of switch SW3 is checked. If the operation of switch SW3 is detected, the control unit in step S206 determines whether the setting operation is complete. Then, the flag indicating the setting operation is pending is reset. In step S207, the DX error flag is reset. The operation of switch SW4 is not checked. In the case that any type of operation is not accomplished, or it is not valid, the flag indicating the setting operation is pending is reset. The control unit returns from the sub-routine shown in FIG. 10 to the sub-routine shown in FIG. 9 at step S45, then to the routine in FIG. 8.

In step S55, the control unit 10 determines whether M2 is set to 5. When M2 is set to 5 and AF mode setting screen A18 is displayed, the operation of the control unit 10 proceeds to step S56. In all other cases, the operation proceeds to step S57. In step S56, shown in M2=5 row of Table 7, the setting of AF mode is performed with the operation of switches SW5 and SW6. When the operation of switch SW5 is detected, AF-S (single mode) is set. When the operation of the switch SW6 is detected, AF-C (continuous mode) is set. In either case, the setting is complete, and the flag indicating the setting operation is pending is reset. The control unit does not respond to the operation of switches SW3 or SW4. In the case that any type of operation is not accomplished or it is not valid, the control unit returns while the flag indicating the setting operation is reset.

In step S57, the control unit 10 determines whether M2 is set to 4. When M2 is set to 4 and it is the first selection screen function, the operation of the control unit proceeds to step S58. In all other cases, the operation proceeds to step S59.

In step S58, shown in M2=4 row of Table 7, the first selection of function is performed. In the case that the operation of switch SW3 is detected and the desired mode is not set, the screen register M2 is set to 0. Control unit 10 changes the display to the mode selection first screen. On the other hand, in the case that the desired mode is set, the screen register is kept at M2 at 4 as it is. The contents of M3 are set to 0 and cleared. And then, in the case that the default jump is made, as shown in Table 3, it becomes the automatic mode. In the case that the operation of switch SW4 is detected, the screen register M2 is set to 5, and the control unit transfers to the AF mode setting screen. When the operation of switch SW5 is detected, the screen register M2 is set to 6, and the film sensitivity setting screen is displayed. When the operation of switch SW6 is detected, the screen register M2 is set to 7, and the exposure adjustment quantity setting screen is displayed. When any other type of switch operation is detected, the control unit determines that the setting is complete, and the flag indicating the setting operation is pending is reset. In the case that any type of operation is not performed, the operation of the control unit returns while the flag indicating the setting operation is pending is set.

In step S59, the control unit 10 determines whether M2 is set to 0. When M2 is set to 0, the mode selection first screen is displayed. The operation of the control unit 10 proceeds to step S60, and in all other cases, the operation proceeds to step S61.

In step S60, shown in M2=0 row of Table 7, the setting of the mode selection first screen is performed.

When the operation of switch SW3 is detected, the screen register M2 is set to 1, and the control unit is set to the P0 through P2 selection screens. When the operation of switch SW4 is detected, 8 of Table 3 is set to the saving register X, and the selection of S mode is stored in the memory. When the operation of switch SW5 is detected, 9 of Table 3 is set to the saving register X, and the selection of A mode is stored in the memory. When the operation of switch SW6 is detected, 10 of Table 3 is set to the saving register X, and the selection of M mode is stored in the memory. When the operation of any one of switches SW4–SW6 is detected, the control unit 10 determines that the setting operation is complete, and the flag indicating the setting operation is pending is reset. In the case that any type of operation is not accomplished, the operation of the control unit 10 proceeds to step S66 while the flag indicating the setting operation is pending is set. The saving register X can function as a buffer memory to store the data memory temporarily. For example, it can be set to RAM 103, or it can be structured with a temporal register mounted in CPU 101.

In step S61, the control unit determines whether M2 is set to 1. When M2 is set to 1 and it is the P0 through P2 selection screens, the operation of the control unit proceeds to step S62, and in all other cases, the operation proceeds to step S63.

In step S62, as shown in M2=1 row of Table 7, the setting of the P0 through P2 selection screen is performed. When the operation of switch SW3 is detected, 0 of Table 3 is set to the saving register, and the selection of the program mode (P0) is stored in the memory. When the operation of switch SW4 is detected, 1 of Table 3 is set to the saving register X, and the selection of the scenery mode (P1) is stored in the memory. When the operation of switch SW5 is detected, 2 of Table 3 is set to the saving register X, and the selection of the portrait mode (P2) is stored in the memory. When the operation of switch SW6 is detected, the screen register M2 is set to 2, and the screen displays the P3 and P4 selection screens. When the operation of any one of switches SW4–SW5 is detected, the control unit determines that the setting is complete, and the flag indicating the setting operation is pending is reset. When the operation of switch SW6 is detected and any type of operation is not performed, the operation of the control unit proceeds to step S66 while the flag indicating is pending the setting operation is set.

In step S63, the control unit 10 determines whether M2 is set to 2. When M2 is set to 2, the P3 and P4 selection screen is displayed. The operation of the control unit 10 proceeds to step S64. In all other cases, that is, in the case that M2 is set to 3, the operation proceeds to step S65.

In step S64, shown in M2=2 row of Table 7, the setting of the P3 and P4 selection screen is performed. When the operation of switch SW3 is detected, the screen register M2 is set to 1, and the P0 through P2 selection screen is displayed. When the operation of switch SW4 is detected, 3 of Table 3 is set to the saving register X, and the selection of the close up mode (P3) is stored in the memory. When the operation of switch SW5 is detected, 4 of Table 3 is set to the saving register X, and the selection of the sports mode (P4) is stored in the memory. When the operation of switch SW6 is detected, the screen register M2 is set to 3, and P5 through P7 selection screen is shown. When the operation of any one of switches SW4 and SW5 is detected, the control unit determines that the setting is complete, and the flag indicating the setting operation is pending is reset. In the case that the operation of switches SW3 and SW6 is detected, and in the case that any type of operation is not performed, the operation of the control unit proceeds to step S66 while the flag indicating the setting operation is pending is set.

In step S65, as shown in M2=3 row of Table 7, the setting of the P5 through P7 selection screen is performed. When the operation of switch SW3 is detected, the screen register M2 is set to 2 and the P3 and P4 selection screen is displayed. When the operation of switch SW4 is detected, 5 of Table 3 is set to the saving register X, and the selection of the night view mode (P5) is stored in the memory. When the operation of switch SW5 is detected, 6 of Table 3 is set to the saving register X, and the selection of the silhouette mode (P6) is stored in the memory. When the operation of switch SW6 is detected, 7 of Table 3 is set to the saving register X, and the selection of the inspiration mode (P7) is stored in the memory. When the operation of any one of switches SW4 and SW6 is detected, the control unit determines that the setting is complete, and the flag indicating the setting operation is pending is reset. When the operation of switch SW3 is detected, and in the case that any type of operation is not performed, the operation of the control unit proceeds to step S66 while the flag indicating the setting operation is pending is set.

In step S66, the control unit determines whether the setting is complete. When the flag indicating the setting operation is pending is set to 1 and the setting has not been completed, the operation of the control unit 10 continues. In the case that the flag indicating the setting operation is pending is set to 0 and the setting has been completed, the operation of the control unit proceeds to step S67.

In step 67, the control unit determines whether M0 is 2. When M0 is 2 and in the function selection mode, the operation of the control unit proceeds to step S69. In the case that M0 is 1 and in the mode selection mode, the operation proceeds to step S68.

In step S68, the numerical value corresponding to the selected mode stored in the saving register X is transferred to the mode register M1. In step S69, the numerical value corresponding to the selected mode stored in the saving register X is transferred to the mode register M3 for memory. The desired mode is stored in the memory. At this time, the contents of the mode register M1 are as they are. Therefore, when it is returned to execution screen, the states have not been changed. In order to make the setting valid that is stored in the memory, the default jump is accomplished. At step S33, the mode register M1 is re-written into the mode register M3 for memory.

Figure 13:
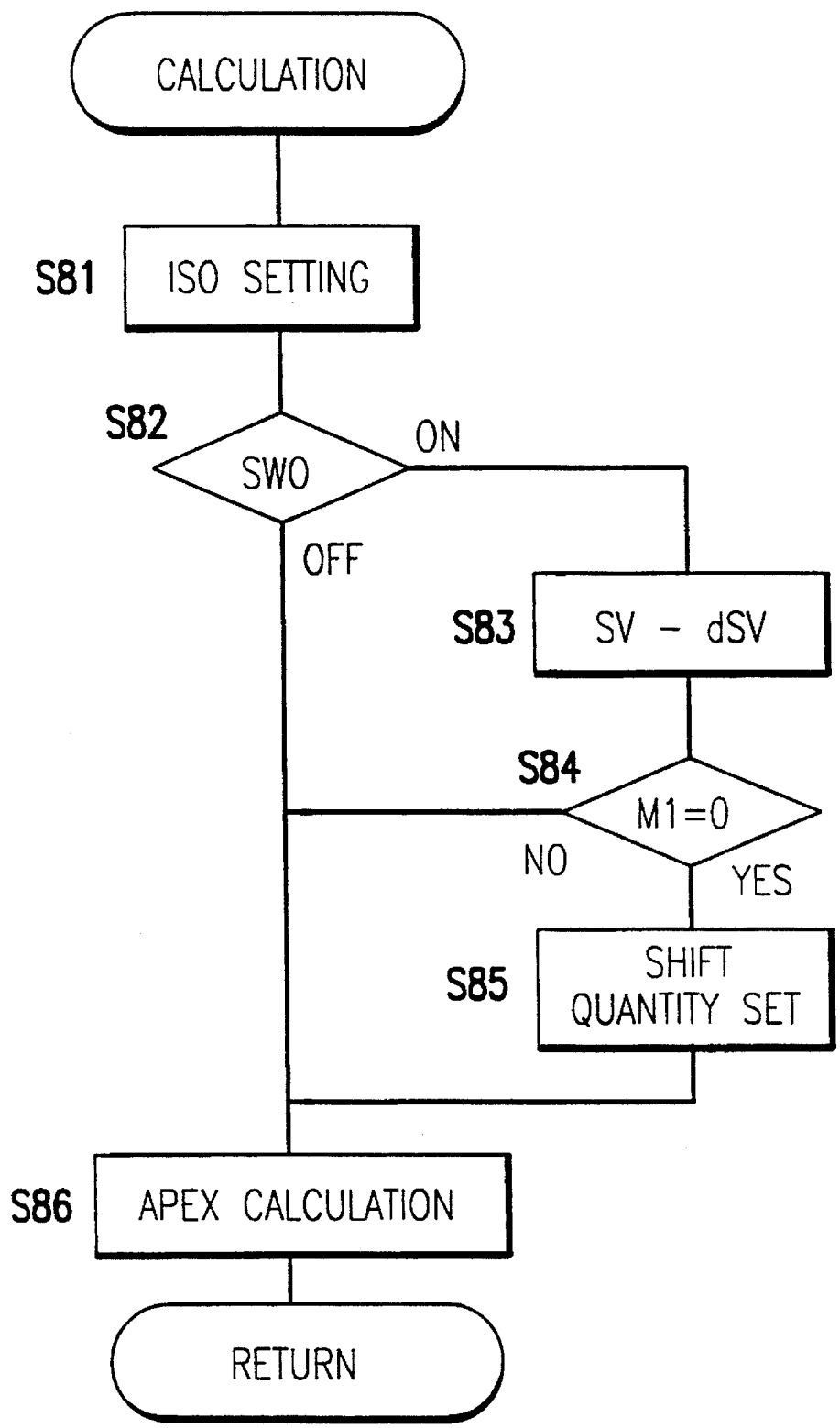
FIG. 13 is a flow chart depicting an example of the process routine regarding the APEX calculation called at the main routine calculation process described above.

FIG. 13 discloses the process routine for the APEX calculation performed during step S3 of FIG. 8. In step S81, the setting of the film sensitivity for APEX calculation is performed. In the case of DX film, the numerical value corresponding to the state being read from DX contact point 14 is set as the film sensitivity. And in the case that it is not DX film, the manual film sensitivity set in sub-routine of FIG. 10 is set.

In step S82, the operation of switch SW0 is checked. When the switch is ON indicating the advanced mode, the operation of the control unit proceeds to step S83. When the switch is OFF indicating the simple mode, the operation proceeds to step S86. In step S83, the exposure adjustment quantity dSV obtained in step S52 of FIG. 12 is deducted from the film sensitivity SV obtained in step S81. This value is set as the actually effective film sensitivity.

In step S84, the control unit determines whether the mode register M1 is set to 0. When the mode register M1 is set to 0 with the program mode, the operation of the control unit proceeds to step S85. In the cases other than the above, the operation proceeds to step S86.

In step S85, the program shift quantity is set. In other words, the combination of the preset aperture and the shutter speed can be changed with this operation. In step S86, the APEX calculation is accomplished in accordance with the states being processed previously using the results above. In the simple mode, the DX setting is followed, and the operation of the camera is not affected by the manual film sensitivity setting or the exposure adjustment results. In the advanced mode, the manual film sensitivity setting or the exposure adjustment setting is valid. In addition, only during the automatic mode in the advanced mode, does program shift become valid.

Figure 14:
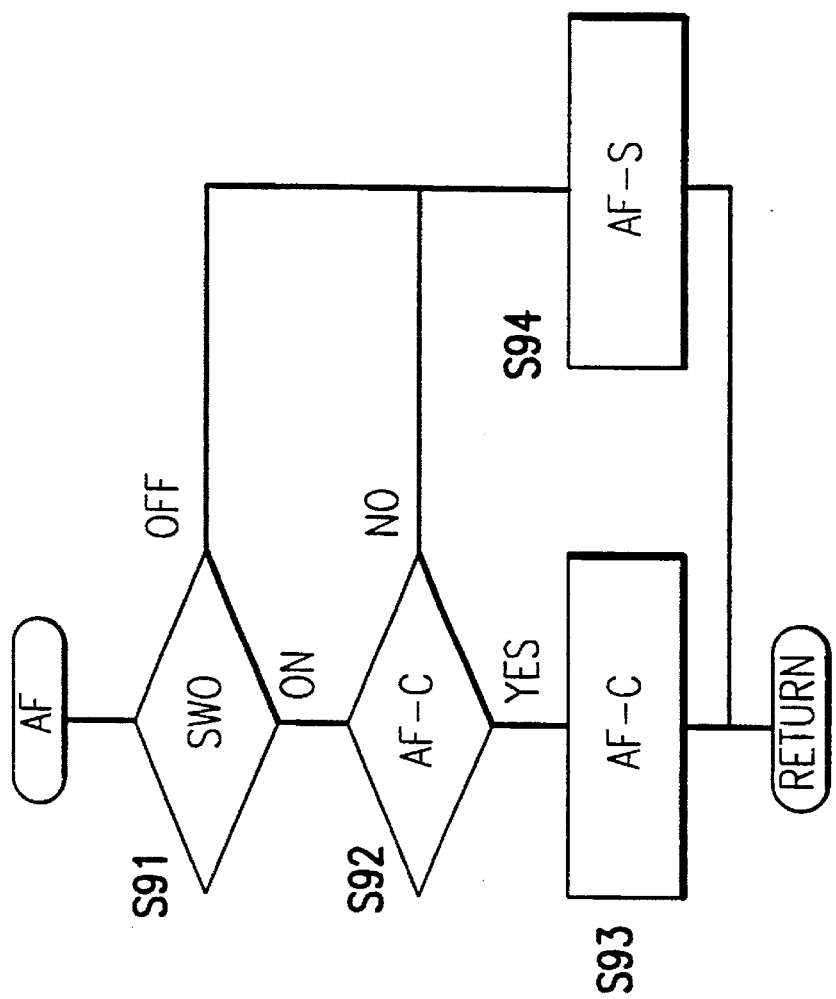
FIG. 14 is a flow chart depicting an example of the AF control routine called at the main routine control process described above.

FIG. 14 is a flow chart showing the AF control routine performed in the control step S4 of FIG. 8. In step S91, the operation of switch SW0 is checked. When the switch indicating the advanced mode, the operation of the control unit proceeds to step S92. When the switch indicates the simple mode, the operation proceeds to step S94. In step S92, the AF-C mode is checked. When the AF-C mode is set at step S56 of FIG. 12, the operation proceeds to step S93. When the AF-S mode is set, the operation proceeds to step S94. In step S93, the control of AF-C mode is performed. In other words, the focusing operation is continued as long as the half depression SW7 is ON. In step S94, the control of AF-C mode is performed. In other words, the focusing operation is continued as long as the half depression SW7 is ON, and when it is focused once, the focusing operation is not continued as long as the half pushing is re-activated.

In the manner described above, in the simple mode, the AF-S control is always performed. In the advanced mode, the AF control is performed in accordance with the AF mode set by the function setting.

Figure 15:
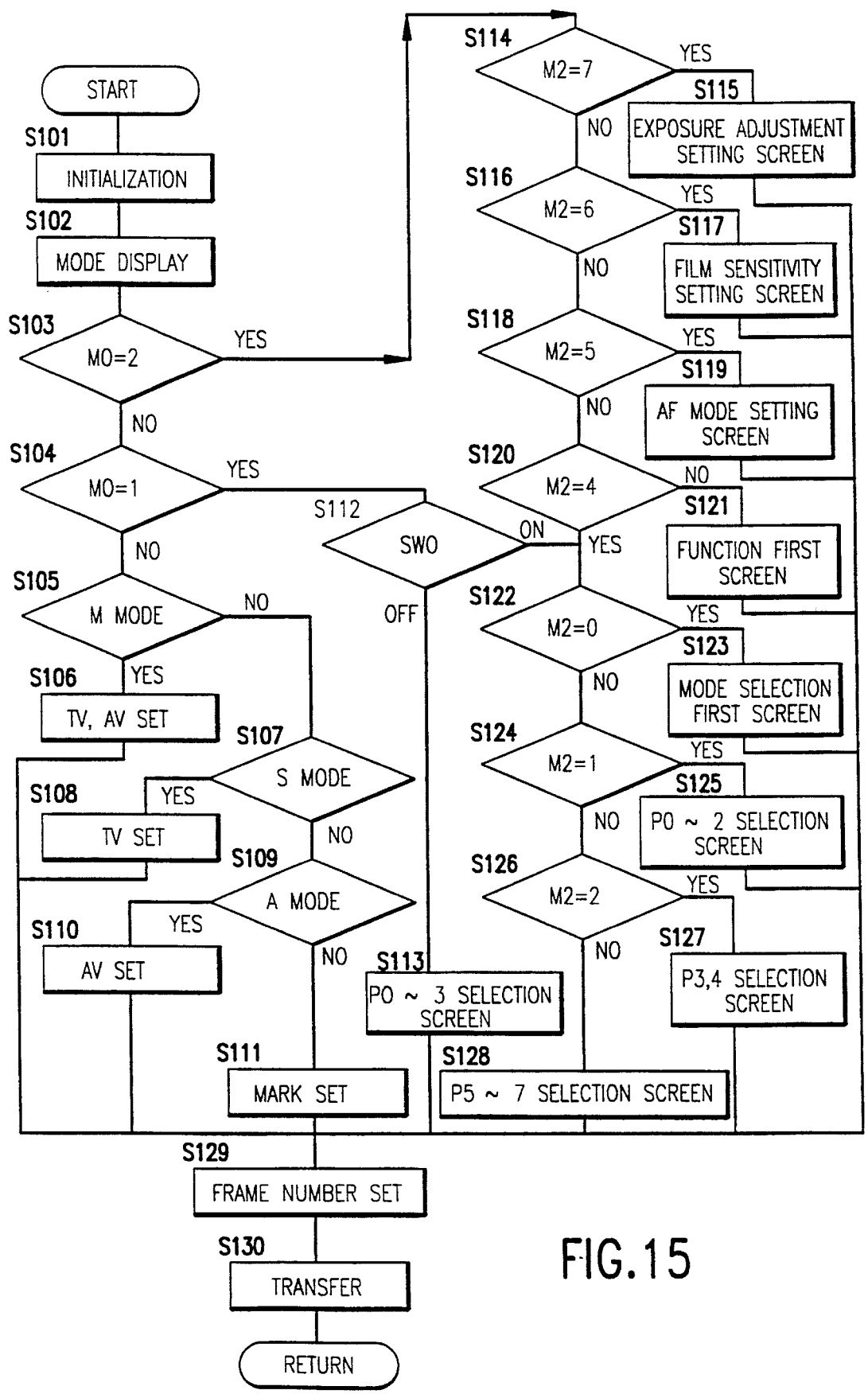
FIG. 15 is a flow chart depicting an example of display routine called at the main routine control process described above.

FIG. 15 is a flow chart of the display routine of the control unit 10 for the control step S4 shown in FIG. 8. In step S101, the data area D0 through D11 transferred to LCD driver 20 is initialized. The address "20" being the blank display in FIG. 7 is set to D0 through D7, and 0 is set for D8 through D11 in order to display the lights in a similar manner.

In step S102, the data to control the segment display sections 35–37 are set. To accomplish the exposure control mode display, for example, the data is set to D11 in accordance with M1, for the implementation screen of the advanced mode and the mode selection screen. When the exposure adjustment is set and the adjustment quantity (dSV) is other than 0, the bit 6 of D10 is set to 1 to flash the segment display section 35. When the setting of desired mode is completed, the bit 7 of D10 is set to 1 to flash the segment display section 36. These segments are not flashed in the simple mode.

In step S103, the control unit determines whether M0 is set to 2. When M0 is set to 2 at the function screen, the operation of the control unit proceeds to step S114, and in the cases other than the above, the operation proceeds to step S104. In step S104, the control unit determines whether M0 is set to 1. When M0 is set to 1 in the mode selection mode, the operation of the control unit proceeds to step S112, and in the cases other than the above, the operation proceeds to step S105. In step S105, the control unit determines whether the mode register M1 is set to 10. When M1 is set to 10 in the M mode, the operation proceeds to step S106, and in the cases other than the above, the operation proceeds to step S107.

In step S106, the display setting of the implementation screen in M mode is performed. In other words, the set TV value and the set AV value are set to the data area of D0 through D7. For example, in the case that F 5.6 of 2000 is set, the addresses "42", "0A", "4A", "0A", "26", "05", "16", and "20" are set to D0 through D7, in accordance with the FIG. 7. In the M mode, the setting of TV value and AV value is possible. Therefore, the binary numerals of "110110" are set to the bits 5 through 0 of D10, and the lighting of the segment display sections 34f, e, c, b is possible.

When "2000" is displayed, the same "0" is displayed, "0A" and "4A" are used. The reason is that, as shown in FIG. 4-a, if a space is placed in the mixture of em display and half-em display, balance between the . . . is made beautifully. The shapes of "4A" and "0A" are identical, however, it is shifted to the left by one dot.

As a result, it is possible to adjust the spacing in the displayed state.

In step S107, the control unit determines whether the mode register M1 is set to 8. When M1 is set to 8 in S mode, the operation of the control unit proceeds to step S108, and in the case other than the above, the operation proceeds to step S109.

In step S108, the display setting of the implementation screen in S mode is performed. In other words, the set TV value is set to the data area D0 through D3. For example, when 2000 is set, in accordance with FIG. 7, the address "42", "0A", "4A", and "0A" are set to D0 through D3. In addition, the S mode is capable of setting the TV value. Therefore, "000110" of binary numerals are set to the bits 5 through 0 of D10, and the segment display of 34b and 34c are lighted.

In step S109, the control unit determines whether the mode register M1 is set to 9. When M1 is set to 9 in A mode, the operation proceeds to step S110, and in the case other than the above (that is, P mode), the operation proceeds to step S111.

In step S110, the set AV value is set to the data *area D4 through D7. For example, when F 5.6 is set, in accordance with FIG. 7, the addresses "26", "05", "16", and "20" are set to D4 through DT. In addition, in the A mode, the setting of AV value is performed. Therefore, "110000" of binary numerals are set to the bits 5 through 0 of D10, and the lighting of the segment displays 34f and 34e is possible.

In step S111, in order to make the mark display possible corresponding to the stored mode in M1 to the LCD display unit of 31a and 31b of the dot matrix display section 310, the data according to Table 8 is set to the data area D0 and D1. In addition, P mode is not capable of setting the TV value or AV value normally. Therefore, "000000" of binary numerals are set to the bits 5 through 0 of D10, and all of the segment display 34 are unlit. However, in order to make the program shift possible, only at the time of the automatic mode of the advanced mode, "1100000" are set, and the segment display section 34e and 34f are lighted.

TABLE 8

| M1 | Mode register | D0 | D1 |
|---|---|---|---|
| 0 | P0: Automatic mode | 80 | 81 |
| 1 | P1: Scenery mode | 82 | 83 |
| 2 | P2: Portrait mode | 84 | 85 |
| 3 | P3: Close up mode | 86 | 87 |
| 4 | P4: Sports mode | 88 | 89 |
| 5 | P5: Night view | 8 C | 8 D |
| 6 | P6: Silhouette mode | 8 E | 8 F |
| 7 | P7: Inspiration mode | 8 A | 8 B |

In step S112, the operation of switch SW0 is checked. In advanced mode, the operation of the control unit proceeds to step S122. In the simple mode, the operation proceeds to step S113. In step S113, for the LCD display unit of 31a–31h to perform the mark display corresponding to the automatic mode, scenery mode, portrait mode, and close up mode, in accordance with Table 8, 80 through 87 are transferred to the data area of D0 through D7. To indicate the ability to select one of the four modes, the segment display of 34a, 34c, 34d, and 34f flash. Therefore, "01101" of the binary numerals are set to the bits 5 through 0 of D10. At the same time, the flashing flag for each is set, and the flashing display is accomplished at step S130, as explained later.

Table 9 shows the numerical values to be set to D0 through D7 to determine the display state in the dot matrix display section 310 being determined by the screen register M2 in the mode selection mode of the advanced mode or the function selection mode. The processes are implemented during the processes from steps S114 through S128.

TABLE 9

| M2 | Display Screen | D0 | D1 | D2 | D3 | D4 | D5 | D6 | D7 |
|---|---|---|---|---|---|---|---|---|---|
| 0 | First mode | 90 | 91 | 92 | 93 | 94 | 95 | 96 | 97 |

TABLE 9-continued

| M2 | Display Screen | D0 | D1 | D2 | D3 | D4 | D5 | D6 | D7 |
|---|---|---|---|---|---|---|---|---|---|
| | selection | | | | | | | | |
| 1 | P0 – P2 selection | 80 | 81 | 82 | 83 | 84 | 85 | A2 | A3 |
| 2 | P3 & P4 selection | A0 | A1 | 86 | 87 | 88 | 89 | A2 | A3 |
| 3 | P5 – P7 selection | A0 | A1 | 8E | 8F | 8C | 8D | 8A | 8B |
| 4 | First function | 98 9A | 99 9B | CE | CF | 9C | 9D | 9E | 9F |
| 5 | AF mode setting | CE | CF | 20 | 20 | AC | AD | AE | AF |
| 6 | Film sensitivity setting | 9C | 9D | A4 A6 | A5 A7 | Set according to AV | | | |
| 7 | Exposure adjustment setting | 9E | 9F | 20 | 20 | Set according to dSV | | | |

In step S114, the control unit 10 determines to whether M2 is 7. When M2 is at 7, and it is in the exposure adjustment setting screen, the control unit proceeds to step S115. In the cases other than the above, the control unit proceeds to step S116. In step S115, as shown in M2=7 row of Table 9, the display data of the exposure adjustment setting screen is set. In other words, 9E and 9F are set to D0 and D1. Concerning D2 and D3, if no process is accomplished, the address "20" set at step S101 will remain, and the display is the blank display. Concerning D4 through D7, the display data for the adjustment quantity is set, in accordance with the set adjustment quantity dSV. In the case that the adjustment quantity is ±0, the display of "±0.0" may be possible by setting the addresses "66", "0A", "60" and "0A" to D4 through D7, in accordance with FIG. 7. Triangle segment 24e flashes to indicate dSV down setting, triangle segment 34f flashes to indicate dSV up setting, and triangle segment 34a flashes to indicate the completion of setting. For that, "110001" of binary numerals are set to the bits 5 through 0 of D10. At the same time the flashing flag of 34-e is set, and the flashing display is performed, described in step S130.

In step S116, the control unit determines whether M2 is 6. When M2 is at 6 and in the film sensitivity setting screen, the operation of the control unit proceeds to step S117. In the cases other than the above, the operation proceeds to step S118. In step S117, as shown in M2=6 row of Table 9, the display data for the film sensitivity setting screen is set. In other words, 9C and 9D are set to D0 and D1. Concerning D2 and D3, A4 and A5 are set for the case of DX film, making "DX" display possible, and A6 and A7 are set for the case that it is not DX film, promoting the manual set displaying "MSET." Concerning D4 through D7, in accordance with the film sensitivity SV being set to DX setting or manual setting, the display data of the film sensitivity is set. When the film sensitivity is 400, the addresses "20", "04", "0A" or "0A" is set to D4 through D7, in accordance with the FIG. 7. When it is not DX film, triangle segment 34e flashes to indicate the SV down setting, triangle segment 34f flashes to indicate the up setting, and triangle segment 34a flashes to indicate the completion of setting. In order to do so, "110001" of binary numerals are set to the bits 5 through 0 of D10. At the same time, the flashing flag of 34a is set, and the flashing display is performed at step S130, discussed below.

In the case of DX film, this is used only for confirmation, therefore, 34a is flashed in order to indicate the completion of setting. In order to do so, "000001" of binary numerals is set to the bits 5 through 0 of D10. At the same time, the flashing flag of 34a is set.

In step S118, the control unit determines whether M2 is 5. When M2 is set to 5 and in AF mode setting screen, the operation of the control unit proceeds to step S119. In the cases other than the above, the operation proceeds to step S120.

In step S119, as shown in M2=5 row of Table 9, the display data of AF mode setting is set. In other words, CE and CF are set to D0 and D1, making "AF" display possible. Concerning D2 and D3, if no process is accomplished, the address "20" set at step S101 will remain, and the display is the blank display. Concerning D4 through D7, total em display of "S" and "C" is possible by setting AC, AD, AE, and AF. The triangle segments 34d and 34f are flashed to promote the setting of "S" or "C". "101000" of binary numerals are set to the bits 5 through 0 of D10, and at the same time, each flashing flag is also set, and the flashing display is made at step S130.

In step S120, the control unit determines whether M2 is 4. When M2 is set to 4 and in the function first screen, the operation of the control unit proceeds to step S121, and in the cases other than the above, the operation proceeds to step S122.

In step S121, as shown in M2=4 row of Table 9, the display data of the function first screen is set. In other words, when the desirable mode is not set to D0 and D1, 98 and 99 are set, making the display possible for the setting operation. When the desirable mode is set, 9A and 9B are set, making the display possible to promote the clear. Concerning D2 through D7, the display of "AF," "ISO," and "±" become possible by setting CE, CF, 9C, 9D, 9E, and 9F. To indicate that one of the four functions above should be selected, the segment displays of 34a, 34c, 34d, and 34f flash. "101101" of binary numerals are set to the bits 5 through 0 of D10. At the same time, each flashing flag is set, and the flashing display is performed at step S130.

In step S122, the control unit determines whether M2 is 0. When M2 is set to 0 in the first mode selection first screen, the operation of the control unit proceeds to step S123. In the cases other than the above, the program operation to step S124.

In step S123, as shown in M2=0 row of Table 9, the display data of the mode selection first screen is set. In other words, by setting the numerical values shown in the same row, the display of "P", "S", "A" and "M" is possible. To indicate that one of the above four functions should be selected, the segment displays of 34a, 34c, 34d, and 34f flash. "101101" of binary numerals are set to the bits 5 through 0 of D10. At the same time, each flashing flag is set, and the flashing display is accomplished at step S130.

In step S124, the control unit determines whether M2 is 1. When M2 is 1 in the P0 through P2 selection screen, the operation of the control unit proceeds to step S125. In the cases other than the above, the operation proceeds to step S126.

In step S125, as shown in M2=1 row of Table 9, the display data of P0 through P2 selection display screen is set. In other words, by setting the numerical values shown in the same row, the screen corresponding to P0 through P2 and the right arrow mark is displayed. Regarding the right arrow mark, the screen is changed, displaying the selection of other mode by pushing the corresponding switch. In addition, in order to indicate that one of the above four functions should be selected, the segment displays of 34a, 34c, 34d, and 34f flash. "101101" of binary numerals are set to the bytes 5 through 0 of D10 and at the same time, each flashing flag is set. The flashing display is accomplished at step S130.

In step S126, the control unit determines whether M2 is 2. When M2 is 2 in the P3 and P4 selection screen, the operation of the control unit proceeds to step S127. In the cases other than the above, that is, in the case of M2 is set to 3, the operation proceeds to step S128.

In step S127, as shown in M2=2 row of Table 9, the display data of P3 and P4 selection screen is set. In other words, by setting the numerical values shown in the same row, the screen corresponding to P3 and P4 and the right and left arrow mark is displayed. Pushing the switches corresponding to the right and left arrow mark, the display screen is changed, displaying the selections for other modes. To indicate that one of the above four functions should be selected, segment displays of 34a, 34c, 34d, and 34f flash. "101101" of binary numerals are set to the bits 5 through 0 of D10 and at the same time, each flashing flag is set, and the flashing display is accomplished at step S130.

In step S128, shown in M2=3 row of Table 9, the display data of P5 through P7 selection screen is set. In other words, by setting the numerical values shown in the same row, the display corresponding to P5 through P7 and the right and left arrow mark display can be made. Operating the switches corresponding to the left arrow mark, the display screen is changed, displaying the selection screens for other modes. To indicate that one of the above four functions should be selected, the segment displays of 34a, 34c, 34d, and 34f flash. "101101" of binary numerals are set to the bits 5 through 0 of D10. At the same time, each flashing flag is set, and the flashing display is accomplished at step S130.

In step S129, the frame number data is set to D8 and D9 To display the address "24""1100110" in binary numerals is set to D8, and the segment displays 32g, 32f, 32c, and 32b flash. The "1011011" in binary numerals is set to D9, and the segment displays 33g, 33e, 33d, 33b, and 33a flash.

In step S130, D0 through D11 data set steps S101-S129 is transferred to LCD driver 20. This produces the display on the display panel 30. When the segment display sections 34a-34f are set to flash, the one second cycle of flash display is possible, by setting the bits 5 through 0 of D10 to 0 for every 0.5 second.

In the manner above described, in the case that DX film is loaded into the camera, DX film reading is possible as it is in DX mode. In the advanced mode, the change in the setting value cannot be made. However, the data confirmation only is possible at the film sensitivity setting screen of the function selection mode. Additionally, the confirmation of the numerical value cannot be performed in the simple mode.

When the back cover is closed and the film is loaded, and the film is not the DX film, DX mode is released, the film sensitivity setting screen is displayed, and it is possible to manually perform the film sensitivity setting. When the setting is completed, the warning state is released. Even when the power source is cut off, the DX warning state remains. Therefore, the film sensitivity setting screen remains until the setting operation is complete. In addition, as shown in FIG. 11, if the back cover is opened, the warning is not needed due to the film exchange. Therefore, DX error should be reset. At this time, the film setting screen is replaced with the first display screen SM1.

In addition, the embodiments described above, 4 locations of display blocks 311–314 are placed to the display panel 30, and the symbol representing each mode is displayed in one line on the first display. Therefore, the selection branches are lined up on one line. So, the photographer who does not have much experience can recognize the selected branch easily. In addition, the switches SW3–SW6 are placed corresponding to the display blocks 311–314. Therefore, the photographer, who is not accustomed to picture taking, is able to recognize the switch to be selected with certainty. Furthermore, the character pattern displayed with dot display is used so that the photographer is able to understand the selections instinctively.

In the simple mode, the mode selection can be established by selecting one of the switches SW3–SW6 in the first display screen. In other words, the camera parameter is inputted to the camera by selecting one of the selection branches. When the selection branch is selected, it moves to the second display. This second screen displays only the symbols indicating the selected mode. Therefore, the photographer is able to recognize the operating mode of the camera with certainty. Furthermore, it is possible to return to the first display from the second display screen, by operating the switch SW2. Therefore, the photographer is able to return to the original display. Additionally, it is possible to move into the automatic mode by pushing the switch SW2 for a designated time. In addition, it is appropriate to move into the mode established in advance. In this case, for example, the special mode register is equipped separately, and in the case that switch SW2 is pushed for more than the designated time, the processes are to be accomplished, assuming that, not the normal mode register, but the mode corresponding to the contents of the special register is selected.

An embodiment according to the present invention is equipped with the menu screen to select the mode and the menu screen to set the function in the first display process in the advanced mode. The mode selection menu screen is displayed with priority. When the mode selection menu screen is displayed, if the change operation is received from the change operation component, it is possible to accomplish the process to change the first display to the function setting menu screen. The film sensitivity setting is contained in the function setting menu.

In addition, the camera according to the present invention is divided into a first mode that performs the selection input of the exposure mode and a second mode that permits the input of data other than the above. Therefore, the exposure, which requires the input in the conventional camera, can be input separately from the other data, without confusion.

According to embodiments of the present invention, the first input mode and the second input mode are set, the former being capable of selecting only a limited number of selection branches. The latter is capable of selecting all of the selection branches. Therefore, a photographer without much experience and a photographer with experience are able to operate with ease in accordance with the level of each experience.

What is claimed is:

1. A camera capable of the selective input of operating parameters, wherein said camera has at least two operating modes, said camera comprising:

a control unit;

a selection component for the selective input of operating parameters;

a display device for displaying said parameters; and an operational component for selecting an operating mode from the at least two operating modes, wherein when a first operating mode is selected by said operational component, said control unit displays a designated number of preset parameters corresponding to said first operating mode on said display device and only permits selection of said designated preset parameters corresponding to said first operating mode by said selection component, and wherein when a second operating mode is selected by said operational component, said control unit displays a designated number of parameters corresponding to said second operating mode for selection by said selecting component and then permits selection of a plurality of additional parameters displayed on said display device by said operational component in place of said designated parameters in response to the selection by said selection component.

2. The camera according to claim 1, wherein the number of parameters capable of selection in said second operating mode is greater than the number of parameters in said first operating mode.

3. The camera according to claim 1, wherein said control unit displays a first mode screen of parameters on said display device when said operational component selects said first operating mode, said selection component permitting selection of one of said displayed preset parameters whereby said control unit displays an implementation screen indicating the selected parameter.

4. The camera according to claim 3, wherein said first mode screen displays parameters corresponding to a group consisting of an automatic mode, a scenery mode, a portrait mode and a close up mode.

5. The camera according to claim 3, wherein said control unit displays a second mode screen of parameters on said display device when said operational component selects said second operating mode, said selection component permitting selection of one of said displayed parameters whereby said control unit displays another second mode screen of additional parameters, wherein said selection component permits selection of said additional parameters.

6. The camera according to claim 5, wherein said second mode screen displays parameters corresponding to a group consisting of a program mode, a shutter priority mode, an aperture priority mode and a manual mode.

7. The camera according to claim 5, wherein said control unit changes said display on said display device from said implementation screen in said second operating mode to said first mode screen of said first operating mode upon operation of said operational component when said control unit is in said second operating mode.

8. The camera according to claim 1, wherein said control unit displays a second mode screen of parameters on said display device when said operational component selects said second operating mode, said selection component permitting selection of one of said displayed parameters whereby said control unit displays another second mode screen of additional parameters, wherein said selection component permits selection of said additional parameters.

9. The camera according to claim 1, wherein said display device includes a plurality of display blocks and said selection component includes a plurality of switches forming a switch group.

10. The camera according to claim 9, wherein said display device is a dot matrix display device containing said plurality of display blocks.

11. The camera according to claim 9, wherein said switch group is arranged adjacent said plurality of display blocks such that each switch of said group corresponds to a display block of said plurality of display blocks whereby a parameter displayed by said control unit in one of said plurality of display blocks can be selected by a corresponding switch of said switch group.

12. The camera according to claim 11, wherein said plurality of display blocks are arranged in a first line and said plurality of switches of said switch group are arranged in a second line adjacent said first line.

13. The camera according to claim 12, wherein each switch of said group is directly adjacent a display block.

14. The camera according to claim 12, further comprising:

an indicator assembly positioned between said plurality of display blocks and said switch group, wherein said indicator assembly provides an indication of which switch of said switch group can be operated to select a parameter displayed on said display blocks.

15. The camera according to claim 1, wherein said operational component for selecting an operating mode is a switch whereby said control unit changes operating modes in response to operation of said switch.

16. A camera capable of selective input of operating parameters, wherein said camera has at least two operating modes, said camera comprising:

control means for controlling the operation of the camera;

input means for selectively inputting camera operating parameters;

display means for displaying said parameters; and selection means for selecting one of said at least two operating modes, wherein when a first operating mode is selected by said selection means said control means displays a designated number of preset parameters corresponding to said first operating mode on said display means and when a second operating mode is selected by said selection means said control means displays a designated number of parameters corresponding to said second operating mode on said display means for selection by said input means and then permits selection of additional parameters displayed on said display means in place of said designated number in response to the selection by said input means.

17. The camera according to claim 16, wherein the number of parameters capable of selection in said second operating mode is greater than the number of parameters in said first operating mode.

18. The camera according to claim 16, wherein said control means displays a first screen of parameters on said display means when said selection means selects said first operating mode, said input means permitting selection of one of said displayed parameters whereby said display means displays a screen indicating the selected parameter.

19. The camera according to claim 18, wherein said control means displays a second screen of parameters on said display means when said selection means selects said second operating mode, said input means permitting selection of one of said displayed parameters whereby said control unit displays another screen of additional parameters and said input means permitting selection of said additional parameters.

20. The camera according to claim 19, wherein said control means changes said display on said display means from said second screen in said second operating mode to said first operating screen of said first mode upon operation of said selection means when said control means is in said second mode.

21. The camera according to claim 16, wherein said control means displays a second screen of parameters on said display means when said selection means selects said second operating mode, said input means permitting selection of one of said displayed parameters whereby said control unit displays another screen of additional parameters and said input means permitting selection of said additional parameters.

22. The camera according to claim 16, wherein said camera includes a body and said display means is positioned adjacent said input means on said camera body.

23. The camera according to claim 16, further comprising:

indicator means for indicating a corresponding relationship between said display means and said selection means to aid a user in selecting a parameter displayed on said display means with said inputting means.

24. A method for selectively inputting operating parameters into a camera having at least two operating modes, said method comprising the steps of:

selecting an operating mode from said at least two operating modes;

displaying a set of operating parameters on a display device corresponding to the selected operating mode;

inputting operating parameters into a control unit of said camera by selecting from said set of operating parameters displayed on said display device; and displaying the selected operating parameters on said display device in place of said set in response to said inputting step.

25. The method according to claim 24, wherein the step of displaying a set of operating parameters on said display device for the selected operating mode includes displaying a designated number of preset parameters on said display device when a first operating mode is selected.

26. The method according to claim 25, wherein the step of inputting operating parameters when a first mode is selected includes selecting one of said designated number of preset parameters displayed on said display device.

27. The method according to claim 24, wherein the step of displaying a set of operating parameters on said display device for the selected operating mode includes a first screen of parameters on said display device when a second operating mode is selected.

28. The method according to claim 27, wherein the step of inputting operating parameters when a second operating mode is selected includes selecting one of said parameters from said first screen displayed on said display device.

29. The method according to claim 28, further comprising the steps of:

displaying additional parameters on said display device after a parameter is selected from said first screen; and selectively inputting parameters from said additional parameters.

30. The method according to claim 29, further comprising the steps of:

returning from said second operating mode to a first operating mode upon selecting said first operating mode when in said second operating mode; and displaying a designated number of preset parameters on said display device when said first operating mode is selected.

31. The method according to claim 24, wherein the step of inputting operating parameters includes selecting an operating parameter displayed on said display device by operating a switch from a group of switches aligned with said display device.

* * * * *